US009182056B2

(12) United States Patent
Ruby et al.

(10) Patent No.: US 9,182,056 B2
(45) Date of Patent: Nov. 10, 2015

(54) PIPE SECTION HAVING POLYARYLENE SULFIDE COMPOSITION BARRIER LAYER

(71) Applicant: Ticona LLC, Florence, KY (US)

(72) Inventors: Michael A Ruby, Cincinnati, OH (US);
David W. Eastep, Winona, MN (US);
Joseph J. Grenci, Florence, KY (US);
Christopher McGrady, Florence, KY (US); Xinyu Zhao, Cincinnati, OH (US);
Rong Luo, Florence, KY (US)

(73) Assignee: Ticona LLC, Florence, KY (US)

( * ) Notice: Subject to any disclaimer, the term of this patent is extended or adjusted under 35 U.S.C. 154(b) by 115 days.

(21) Appl. No.: 13/862,931

(22) Filed: Apr. 15, 2013

(65) Prior Publication Data

US 2013/0291991 A1 Nov. 7, 2013

Related U.S. Application Data

(60) Provisional application No. 61/623,618, filed on Apr. 13, 2012, provisional application No. 61/665,423, filed on Jun. 28, 2012, provisional application No. 61/678,370, filed on Aug. 1, 2012, provisional (Continued)

(51) Int. Cl.
*F16L 9/12* (2006.01)
*F16L 9/14* (2006.01)

(Continued)

(52) U.S. Cl.
CPC ............... *F16L 9/133* (2013.01); *C08L 81/02* (2013.01); *C08L 81/04* (2013.01); *F16L 9/147* (2013.01);

(Continued)

(58) Field of Classification Search
CPC .............. F16L 9/00; F16L 9/02; F16L 9/04; F16L 9/042; F16L 9/12; F16L 9/121; F16L 9/123; F16L 9/127; F16L 9/128; F16L 9/133; F16L 9/16; F16L 9/18; B32B 1/80; Y10T 428/1393
USPC ......... 428/34.4–34.7, 35.7–36.2, 36.4–36.91; 138/140–150, 153–155, 172, 173
See application file for complete search history.

(56) References Cited

U.S. PATENT DOCUMENTS 3,354,129 A 11/1967 Edmonds, Jr. et al.
3,919,177 A 11/1975 Campbell (Continued)

FOREIGN PATENT DOCUMENTS

CA 2032370 6/1991
CN 2627320 7/2004

(Continued)

OTHER PUBLICATIONS

Abstract of French Patent—FR 2617176, Dec. 30, 1988, 1 page.

(Continued)

*Primary Examiner* — Walter B Aughenbaugh
(74) *Attorney, Agent, or Firm* — Dority & Manning, P.A.

(57) ABSTRACT

Pipe sections and methods for forming pipe sections are disclosed. A pipe section includes a hollow body, the hollow body having an inner surface and an outer surface, the inner surface defining an interior. The pipe section further includes a barrier layer surrounding the hollow body, the barrier layer having an inner surface and an outer surface. The barrier layer is formed from a polyarylene sulfide composition. The polyarylene sulfide composition includes a polyarylene sulfide and a crosslinked impact modifier. Such pipe sections exhibit high strength characteristics and flexibility as well as resistance to degradation, even in extreme temperature environments, while maintaining desirable processing characteristics.

33 Claims, 16 Drawing Sheets

Related U.S. Application Data application No. 61/703,331, filed on Sep. 20, 2012, provisional application No. 61/707,314, filed on Sep. 28, 2012, provisional application No. 61/717,899, filed on Oct. 24, 2012, provisional application No. 61/739,926, filed on Dec. 20, 2012.

(51) Int. Cl.

| | | |
|---|---|---|
| *B32B 1/08* | (2006.01) | |
| *F16L 9/133* | (2006.01) | |
| *F16L 9/147* | (2006.01) | |
| *C08L 81/04* | (2006.01) | |
| *C08L 81/02* | (2006.01) | |
| *F16L 11/00* | (2006.01) | |
| *F27B 14/00* | (2006.01) | |

(52) U.S. Cl.
CPC .............. *F16L 11/00* (2013.01); *F27B 14/00* (2013.01); *Y10T 428/1352* (2015.01); *Y10T 428/1393* (2015.01); *Y10T 428/1397* (2015.01); *Y10T 428/2958* (2015.01)

(56) References Cited

U.S. PATENT DOCUMENTS

| | | | |
|---|---|---|---|
| 4,337,329 A | | 6/1982 | Kubo et al. |
| 4,368,321 A | | 1/1983 | Sherk et al. |
| 4,371,671 A | | 2/1983 | Anderson |
| 4,384,081 A | | 5/1983 | Kubo et al. |
| 4,452,951 A | | 6/1984 | Kubo et al. |
| 4,464,515 A | | 8/1984 | Rempel et al. |
| 4,503,196 A | | 3/1985 | Rempel et al. |
| 4,581,417 A | | 4/1986 | Buding et al. |
| 4,680,224 A | * | 7/1987 | O'Connor .................. 428/298.1 |
| 4,814,430 A | | 3/1989 | Iwasaki et al. |
| 4,889,893 A | | 12/1989 | Kobayashi et al. |
| 5,006,605 A | | 4/1991 | Mizuno et al. |
| 5,047,465 A | | 9/1991 | Auerbach |
| 5,087,666 A | | 2/1992 | Yu et al. |
| 5,149,731 A | | 9/1992 | Uota et al. |
| 5,240,973 A | | 8/1993 | Katoh et al. |
| 5,240,988 A | | 8/1993 | Kohler et al. |
| 5,248,730 A | | 9/1993 | Yamao |
| 5,270,305 A | | 12/1993 | Palmer |
| 5,380,783 A | | 1/1995 | Satake et al. |
| 5,397,839 A | | 3/1995 | Patel |
| 5,504,141 A | | 4/1996 | Collard et al. |
| 5,578,679 A | | 11/1996 | Suzuki et al. |
| 5,589,544 A | | 12/1996 | Horrion |
| 5,625,002 A | | 4/1997 | Kadoi et al. |
| 5,652,287 A | | 7/1997 | Sullivan |
| 5,654,358 A | | 8/1997 | Kadoi et al. |
| 5,668,214 A | | 9/1997 | Suzuki |
| 5,770,313 A | | 6/1998 | Furumoto et al. |
| 5,817,723 A | | 10/1998 | Flexman, Jr. et al. |
| 5,830,965 A | | 11/1998 | Imaizumi et al. |
| 5,837,758 A | | 11/1998 | Brown et al. |
| 5,840,830 A | | 11/1998 | Miyahara et al. |
| 5,876,548 A | | 3/1999 | Strassel et al. |
| 6,001,934 A | | 12/1999 | Yamanaka et al. |
| 6,015,858 A | | 1/2000 | Gornowicz |
| 6,020,431 A | | 2/2000 | Venkataswamy et al. |
| 6,039,083 A | | 3/2000 | Loper |
| 6,117,950 A | | 9/2000 | Yamao et al. |
| 6,225,416 B1 | | 5/2001 | Reil et al. |
| 6,281,286 B1 | | 8/2001 | Chorvath et al. |
| 6,362,287 B1 | | 3/2002 | Chorvath et al. |
| 6,417,293 B1 | | 7/2002 | Chorvath et al. |
| 6,538,071 B1 | | 3/2003 | Fuchs |
| 6,569,955 B1 | | 5/2003 | Brewer et al. |
| 6,569,958 B1 | | 5/2003 | Gross et al. |
| 6,608,136 B1 | | 8/2003 | Dean et al. |
| 6,649,704 B2 | | 11/2003 | Brewer et al. |
| 6,653,437 B2 | | 11/2003 | Hinokimori et al. |
| 6,657,014 B1 | | 12/2003 | Mori et al. |
| 6,699,946 B1 | | 3/2004 | Lambla et al. |
| 6,713,569 B2 | | 3/2004 | Chorvath et al. |
| 6,740,707 B2 | | 5/2004 | Ono et al. |
| 6,740,709 B2 | | 5/2004 | Ono et al. |
| 6,743,868 B2 | | 6/2004 | Fournier et al. |
| 6,849,697 B2 | | 2/2005 | Lambla et al. |
| 6,875,517 B2 | | 4/2005 | Bosshammer et al. |
| 6,888,719 B1 | | 5/2005 | Janzen et al. |
| 6,889,715 B2 | | 5/2005 | Fraser et al. |
| 7,011,114 B2 | * | 3/2006 | Suzuki et al. ................. 138/137 |
| 7,041,741 B2 | | 5/2006 | Patel et al. |
| 7,111,646 B2 | | 9/2006 | Sato |
| 7,192,063 B2 | | 3/2007 | Takagi et al. |
| 7,208,207 B2 | | 4/2007 | Ono et al. |
| 7,442,744 B2 | | 10/2008 | Tokushige et al. |
| 7,717,138 B2 | | 5/2010 | Takagi |
| 7,810,524 B2 | | 10/2010 | Sakazaki |
| 7,887,660 B2 | | 2/2011 | Jeruzal et al. |
| 7,946,313 B2 | | 5/2011 | Vo |
| 7,960,473 B2 | | 6/2011 | Kobayashi et al. |
| 7,976,920 B2 | | 7/2011 | Braad et al. |
| 7,981,981 B2 | | 7/2011 | Ajbani et al. |
| 8,163,364 B2 | | 4/2012 | Braad et al. |
| 8,210,212 B2 | | 7/2012 | Buchner |
| 8,276,620 B2 | | 10/2012 | Vo |
| 8,322,382 B2 | | 12/2012 | Slagsvold et al. |
| 8,353,316 B2 | | 1/2013 | Do |
| 8,603,599 B2 | | 12/2013 | Matsuo et al. |
| 2003/0121560 A1 | | 7/2003 | Morohoshi et al. |
| 2005/0208248 A1 | | 9/2005 | Ilo et al. |
| 2005/0211327 A1 | | 9/2005 | Kahn et al. |
| 2006/0229417 A1 | | 10/2006 | Ferrate et al. |
| 2009/0301594 A1 | | 12/2009 | Raudies et al. |
| 2010/0048777 A1 | | 2/2010 | Kodama et al. |
| 2010/0062202 A1 | | 3/2010 | Procida |
| 2010/0101675 A1 | | 4/2010 | Do et al. |
| 2010/0266790 A1 | | 10/2010 | Kusinski et al. |
| 2010/0307622 A1 | | 12/2010 | Nezu et al. |
| 2011/0041947 A1 | | 2/2011 | Shafer et al. |
| 2011/0114215 A1 | | 5/2011 | Jeruzal et al. |
| 2011/0232798 A1 | | 9/2011 | Braad et al. |
| 2011/0287201 A1 | | 11/2011 | Abe et al. |
| 2012/0037397 A1 | * | 2/2012 | Mhetar .................. 174/110 SR |
| 2013/0273286 A1 | | 10/2013 | Luo et al. |
| 2013/0273287 A1 | | 10/2013 | Luo et al. |
| 2013/0273288 A1 | | 10/2013 | Luo et al. |
| 2013/0273289 A1 | | 10/2013 | Luo et al. |
| 2013/0273290 A1 | | 10/2013 | Luo et al. |

FOREIGN PATENT DOCUMENTS

| | | |
|---|---|---|
| EP | 1890066 | 2/2008 |
| GB | 1558491 | 1/1980 |
| JP | H03-021435 | 1/1991 |
| JP | 2964570 B2 | 10/1999 |
| JP | 3117492 B2 | 12/2000 |
| JP | 4061705 B2 | 3/2008 |
| KR | 10-2008-0064041 | 7/2000 |
| WO | WO 91/18055 | 11/1991 |
| WO | WO 94/16018 | 7/1994 |
| WO | WO 2010/121143 | 10/2010 |

OTHER PUBLICATIONS

Abstract of Japanese Patent—JPH 06-65376A, Mar. 8, 1994, 1 page.
Abstract of Japanese Patent—JPH 09-59514A, Mar. 4, 1997, 1 page.
Abstract of Japanese Patent—JPH 11-124476A, May 11, 1999, 1 page.
Abstract of Japanese Patent—JP 2001-115020A, Apr. 24, 2001, 1 page.
Abstract of Japanese Patent—JP 2001-279097A, Oct. 10, 2001, 1 page.
Abstract of Japanese Patent—JP 2004-300270A, Oct. 28, 2004, 1 page.
Abstract of Japanese Patent—JP2007-169550A, Jul. 5, 2007, 1 page.
Abstract of Japanese Patent—JP2011-020401A, Feb. 3, 2011, 1 page.

(56) References Cited

OTHER PUBLICATIONS

Machine Translation of Japanese Patent—JP 3618018B, Feb. 9, 2005, 30 pages.
Machine Translation of Japanese Patent—JP 3889122B, Mar. 7, 2007, 24 pages.
Machine Translation of Japanese Patent—JP 4235893B, Mar. 11, 2009, 26 pages.
Machine Translation of Japanese Patent—JP 4552434B, Sep. 29, 2010, 29 pages.
Machine Translation of Japanese Patent—JP 4600015B, Dec. 15, 2010, 44 pages.
Machine Translation of Japanese Patent—JP 4600016B, Dec. 15, 2010, 43 pages.
Machine Translation of Japanese Patent—JP 5029881B, Sep. 19, 2012, 60 pages.
Machine Translation of Japanese Patent—JP 5051428B, Oct. 17, 2010, 31 pages.

* cited by examiner

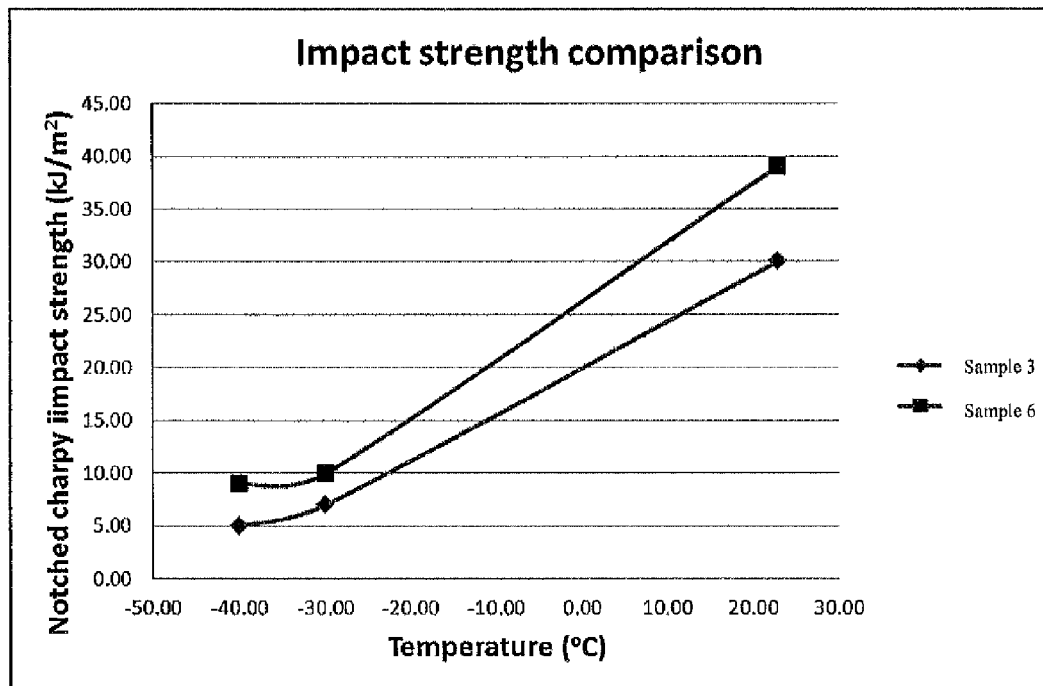
FIG. 20
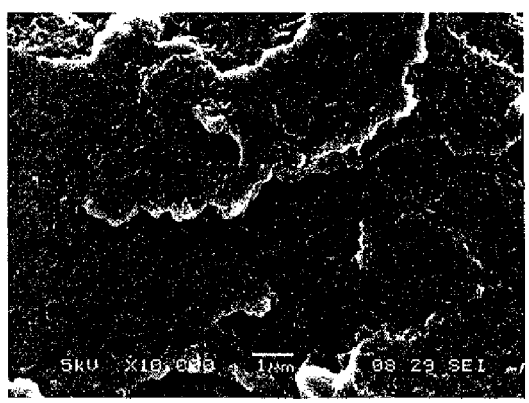 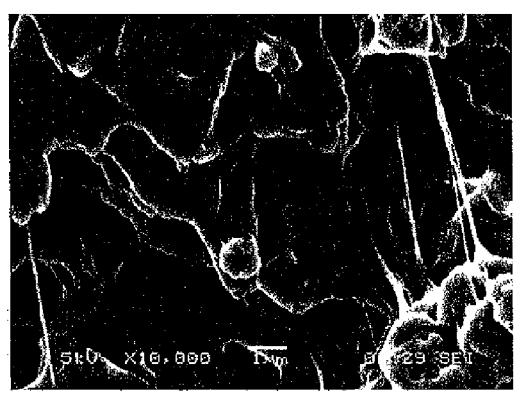
FIG. 21A (Sample 3)   FIG. 21B (Sample 6)

PIPE SECTION HAVING POLYARYLENE SULFIDE COMPOSITION BARRIER LAYER

CROSS REFERENCE TO RELATED APPLICATIONS

The present application claims filing benefit of U.S. Provisional Patent application 61/623,618 having a filing date of Apr. 13, 2012; U.S. Provisional Patent application 61/665,423 having a filing date of Jun. 28, 2012; U.S. Provisional Patent application 61/678,370 having a filing date of Aug. 1, 2012; U.S. Provisional Patent application 61/703,331 having a filing date of Sep. 20, 2012; U.S. Provisional Patent application 61/707,314 having a filing date of Sep. 28, 2012; U.S. Provisional Patent application 61/717,899 having a filing date of Oct. 24, 2012; and U.S. Provisional Patent application 61/739,926 having a filing date of Dec. 20, 2012, all of which are incorporated herein by reference in their entirety.

BACKGROUND OF THE INVENTION

Multi-layer pipe assemblies are commonly utilized to convey oil, gas, and/or other suitable fluids. In particular, such pipe assemblies are employed in the oil and gas industry, such as in subsea applications as well as in oil and gas production fields. In on-shore or subsea applications, for example, multi-layer pipes may be utilized in risers, transfer lines, umbilicals and/or other suitable pipe assemblies. In production field applications, multi-layer pipes may be utilized in risers, infield flow lines, export pipelines and/or other suitable pipe assemblies.

Multi-layer pipe assemblies, and the pipe sections thereof, typically include at least two layers; a hollow body or inner layer, and a barrier layer or outer layer generally surrounding the hollow body. Other layers may further be included generally surrounding the barrier layer. Various materials have been utilized to form each of these layers in an effort to improve various performance characteristics of the resulting pipe sections. Additionally, these layers have been bonded together or left unbonded, depending on the application and the desired performance of the pipe section. For example, U.S. Pat. No. 5,876,648 discloses a pipe section having a metal inner layer and an outer layer formed by particular shrinkable polymers. U.S. Pat. No. 6,039,083 discloses a pipe section having a metal inner layer and an outer layer formed by particular polymers. U.S. Pat. No. 8,210,212 discloses a pipe section having a metal inner layer and a polymer outer layer. U.S. Pat. No. 8,163,364 discloses a pipe section having a polymer layer and a film layer. U.S. Patent Application No. 2009/0301594 discloses a pipe section having a metal inner layer and an outer layer formed from a polyphenylene sulfide (PPS). U.S. Patent Application No. 2010/0326558 discloses a pipe section having an inner layer and a polymer outer layer. U.S. Patent Application No. 2011/0041947 discloses a pipe section having a thermoplastic inner layer and a tape outer layer bonded to the inner layer. Japanese Patent No. 3021435 discloses a pipe section having a thermoplastic inner layer and a tape outer layer.

The materials utilized in such known pipe assemblies do not provide the characteristics required for many applications. For example, in many cases, pipe assemblies are undesirably heavy. Lightweight pipe assemblies formed using polymer materials such as those described above, however, may not exhibit both the flexibility and high strength and resistance properties required by, for example, oil and gas applications.

Polymer blends that exhibit flexibility in addition to high strength and resistance properties are of significant commercial interest. Such blends have been formed in the past by uniformly mixing an elastic component with a thermoplastic polyolefin such that the elastomer is intimately and uniformly dispersed as a discrete or co-continuous phase within a continuous phase of the polyolefin. Vulcanization of the composite crosslinks the components and provides improved temperature and chemical resistance to the composition. When vulcanization is carried out during combination of the various polymeric components it is termed dynamic vulcanization.

Polyarylene sulfides are high-performance polymers that may withstand high thermal, chemical, and mechanical stresses and are beneficially utilized in a wide variety of applications. Polyarylene sulfides have often been blended with other polymers to improve characteristics of the product composition. For example, elastomeric impact modifiers have been found beneficial for improvement of the physical properties of a polyarylene sulfide composition. Compositions including blends of polyarylene sulfides with impact modifying polymers have been considered for high performance, high temperature applications.

Unfortunately, elastomeric polymers generally considered useful for impact modification are not compatible with polyarylene sulfides and phase separation has been a problem in forming compositions of the two. Attempts have been made to improve the composition formation, for instance through the utilization of compatibilizers. However, even upon such modifications, compositions including polyarylene sulfides in combination with impact modifying polymers still fail to provide product performance as desired, particularly in applications that require both high heat and/or chemical resistance and high impact resistance.

Accordingly, improved pipe sections and assemblies formed from such pipe sections are desired in the art. In particular, pipe sections that utilize polyarylene sulfide compositions that exhibit high strength characteristics and flexibility as well as resistance to degradation, even in extreme temperature environments, while maintaining desirable processing characteristics, would be advantageous.

SUMMARY OF THE INVENTION

In accordance with one embodiment of the present invention, a pipe section is disclosed. The pipe section includes a hollow body, the hollow body having an inner surface and an outer surface, the inner surface defining an interior. The pipe section further includes a barrier layer surrounding the hollow body, the barrier layer having an inner surface and an outer surface. The barrier layer is formed from a tape including a polyarylene sulfide composition, the polyarylene sulfide composition comprising a polyarylene sulfide and a crosslinked impact modifier.

In accordance with another embodiment of the present invention, a pipe section is disclosed. The pipe section includes a hollow body, the hollow body having an inner surface and an outer surface, the inner surface defining an interior. The pipe section further includes a barrier layer surrounding the hollow body, the barrier layer having an inner surface and an outer surface. The barrier layer includes a continuous fiber reinforced polyarylene sulfide composition, the polyarylene sulfide composition comprising a polyarylene sulfide and a crosslinked impact modifier.

In accordance with another embodiment of the present invention, a method for forming a pipe section is disclosed. The method includes surrounding a hollow body with a barrier layer such that the barrier layer is in contact with an outer surface of the hollow body. The barrier layer is formed from a tape comprising a polyarylene sulfide composition, the polyarylene sulfide composition including a polyarylene sulfide and a crosslinked impact modifier.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 20 illustrates the effect of temperature change on the notched Charpy impact strength of a polyarylene sulfide composition as described herein and that of a comparison composition.

FIG. 21 is a scanning electron microscope image of a polyarylene sulfide composition as described herein (FIG. 21A) and a comparison polyarylene sulfide (FIG. 21B).

Figure 1:
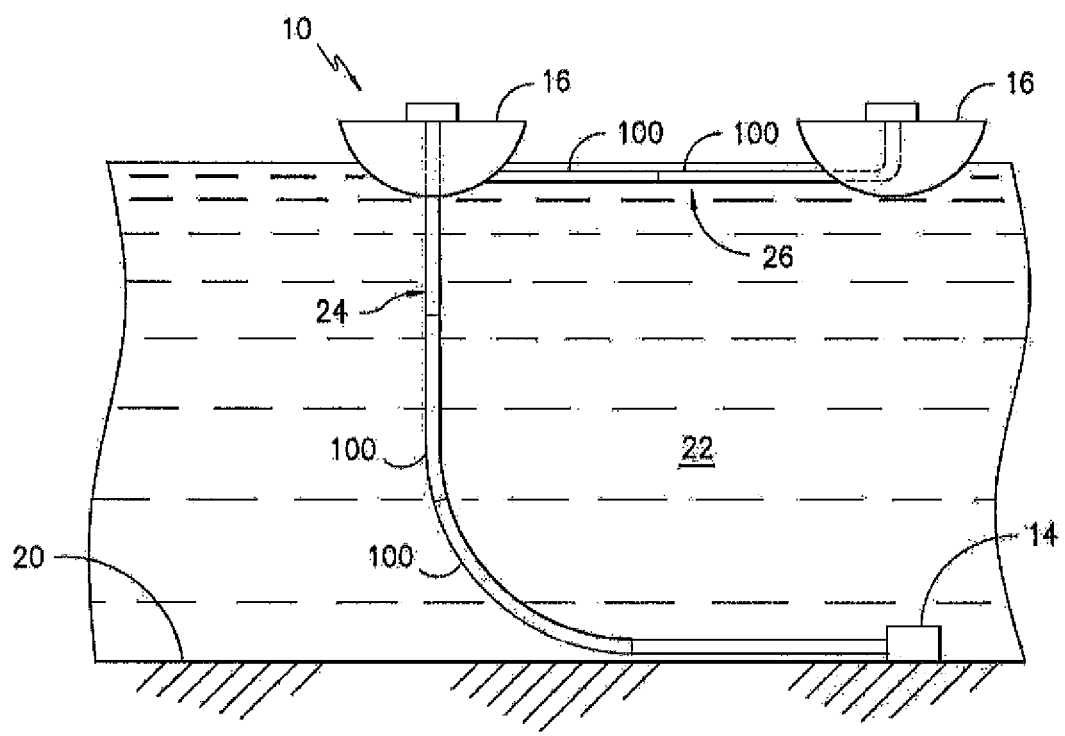
FIG. 1 illustrates various pipe assemblies in a subsea application in accordance with one embodiment of the present disclosure.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present disclosure is directed to pipe sections and methods for forming pipe sections. The resulting pipe sections may be utilized in a variety of applications and, in particular, in harsh environments, such as in oil and gas applications. Advantageously, the materials utilized to form pipe sections according to the present disclosure can be tailored for specific applications so as to withstand specific environments and the associated temperatures, pHs, abrasion, etc. Pipe sections formed according to the present disclosure are advantageously lightweight and exhibit flexibility in addition to high strength and resistance properties.

As discussed in detail below, one or more layers of a multi-layer pipe section formed according to the present disclosure may be formed from a polyarylene sulfide composition that exhibits excellent strength and flexibility characteristics as well as resistance to chemical degradation due to contact with, e.g., water, oils, gas, synthetic or natural chemicals, etc. Beneficially, the polyarylene sulfide composition can maintain good physical characteristics even when utilized in extreme temperature applications such as high temperatures and low temperatures as may be encountered in piping applications. The polyarylene sulfide can also maintain good physical characteristics under conditions in which the materials are subjected to extreme temperature fluctuations.

In some embodiments, a pipe section formed according to the present disclosure may be utilized in an oil and gas application. For example, in subsea applications, a pipe section formed according to the present disclosure may be utilized in a riser, transfer line, umbilical or other suitable subsea pipe assembly. Risers, transfer lines, etc. may flow oil or gas therethrough. Umbilicals may include various elements for transferring fluids and/or electric current/signals. For example, an umbilical may contain elongated umbilical elements (e.g., two or more), such as a channel element, fluid pipe, electric conductor/wire (e.g., optic fiber cable), armoring wire, etc. The pipe section may enclose these elements. In production field applications, pipe sections formed according to the present disclosure may be utilized in risers, infield flow lines, export pipelines and/or other suitable pipe assemblies.

A pipe section according to the present disclosure includes a hollow body and one or more barrier layers surrounding the hollow body. The barrier layers may be bonded to the hollow body or may be unbounded. A barrier layer according to the present disclosure is formed from a polyarylene sulfide composition as discussed herein. The polyarylene sulfide composition further may include a plurality of fibers embedded therein. Advantageously, continuous fibers may be utilized in the barrier layer in one embodiment. Further, in exemplary embodiments, the barrier layer is a tape that includes the polyarylene sulfide composition, which may be fiber reinforced. The use of barrier layers formed from a fiber reinforced polyarylene sulfide composition may impart numerous advantages to the pipe sections formed therefrom. The use of a polyarylene sulfide composition as discussed herein allows such barrier layers to be lightweight and exhibit flexibility in addition to high strength and resistance properties. Additionally, the use of continuous fibers embedded in the polyarylene sulfide composition can increase the strength of the barrier layer. The increased strength provides, for example, improved burst pressure resistance and tensile strength. Such fiber reinforced polyarylene sulfide compositions can thus provide the pipe sections with increased strength while allowing the pipe section to maintain suitable flexibility, etc.

FIG. 1 illustrates one embodiment of a subsea pipe system 10, which is one application in which pipe sections formed according to the present disclosure may be utilized. The pipe system 10 may include one or more pipe sections 100, and extends between a subsea facility 14, such as a well bore, and a vessel 16, such as a drilling rig, ship, etc., or between two vessels 16, or otherwise. The subsea facility 14 may be adjacent to the bottom 20 of a body of water 22. The vessel 16 and/or subsea facility 14 may be permanently installed or movable within the body of water 22. In certain embodiments, the subsea pipe system 10 may be employed in water having a depth of about 2,500 meters or more, in some embodiments about 4,000 meters or more, and in some embodiments, from about 5,000 to about 15,000 meters. The subsea pipe system 900 may span significant portions of these depths.

In exemplary embodiments, a subsea pipe system 10 is utilized to transport a liquid, such as oil, or a gas or other components such as electrical or other control lines between the subsea facility 14 and the vessel 16, or to contain various elements therein. The pipe system 10 may thus include, for example, a riser 24, a transport line 26, an umbilical, or any other suitable pipe for such applications. A pipe section 100 according to the present disclosure may be utilized to form any one or more of these pipe assemblies.

Figure 2:
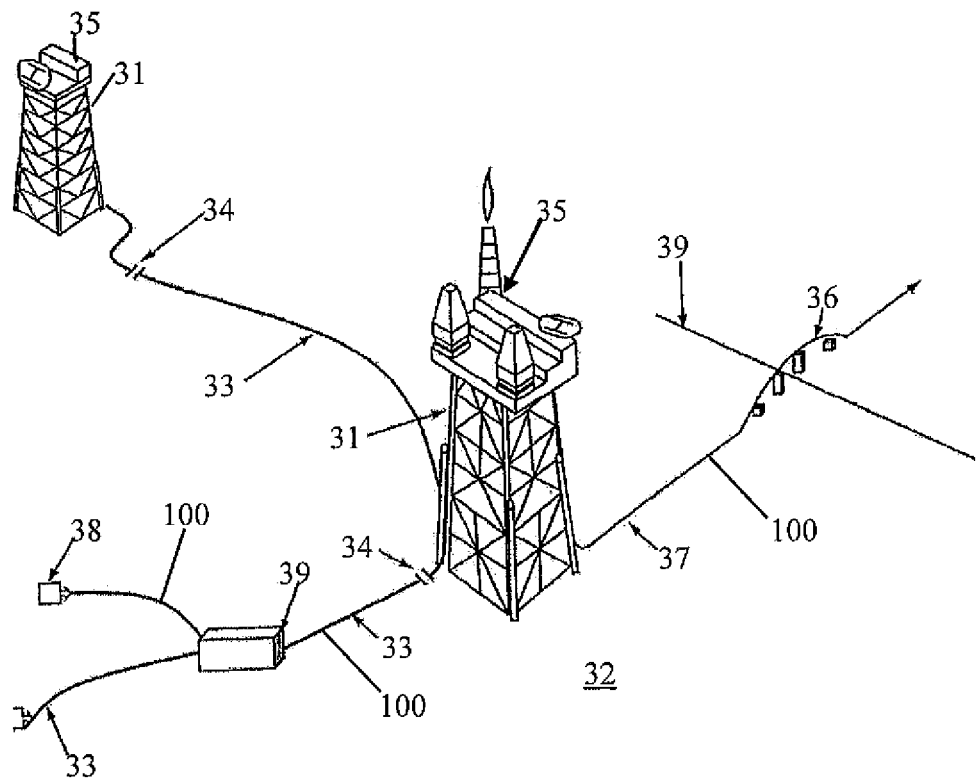
FIG. 2 illustrates various pipe assemblies in a production field application in accordance with one embodiment of the present disclosure.

FIG. 2 illustrates a typical production field that can incorporate a pipe section according to the present disclosure in various pipe assemblies. As can be seen, the field can include fixed risers 31 that can carry production fluid from the sea floor 32 to a platform 35. The field can include infield flowlines 33 that can carry production fluid, supporting fluids, umbilicals, etc., within the field. In addition, both the risers 31 and the infield flowlines 33 can be bundled lines. The system also includes a plurality of tie-ins 34 at which point different flowlines can be merged, for instance to form a bundled riser and/or where individual flowlines may be altered, for instance through expansion. The system also includes a plurality of satellite wells 38 from which the hydrocarbon production fluid is obtained as well as various manifolds. An export pipeline 37 can carry production fluid from the platform 35 to shore, a storage facility, or a transport vessel. The export pipeline 37 may also include one or more crossings 36 to by-pass other flowlines, e.g., another pipeline 39. A pipe section 100 according to the present disclosure may be utilized to form any one or more of these pipe assemblies FIGS. 3 through 6 illustrate pipe sections 100 according to various embodiments of the present disclosure. A pipe section 100 includes a hollow body 102. The hollow body 102 has an inner surface 104 and an outer surface 106, as shown. The inner surface 104 defines an interior 108 of the hollow body 102, through which a suitable material, such as a liquid or gas as discussed above, may flow. The hollow body 102 may in exemplary embodiments be generally cylindrical, having a circular or oval-shaped cross-sectional profile. Alternatively, the hollow body 102 may have any suitable shape, which may be constant or may vary. The hollow body 102 may extend along a longitudinal axis 110. It should be noted that the longitudinal direction 110 is a direction generally through the center of the hollow body 102, and may correspond for example to a flow direction through the hollow body 102. Thus, the longitudinal direction 110 may curve at any suitable angle as required based on the curvature of the hollow body 102.

Figure 3:
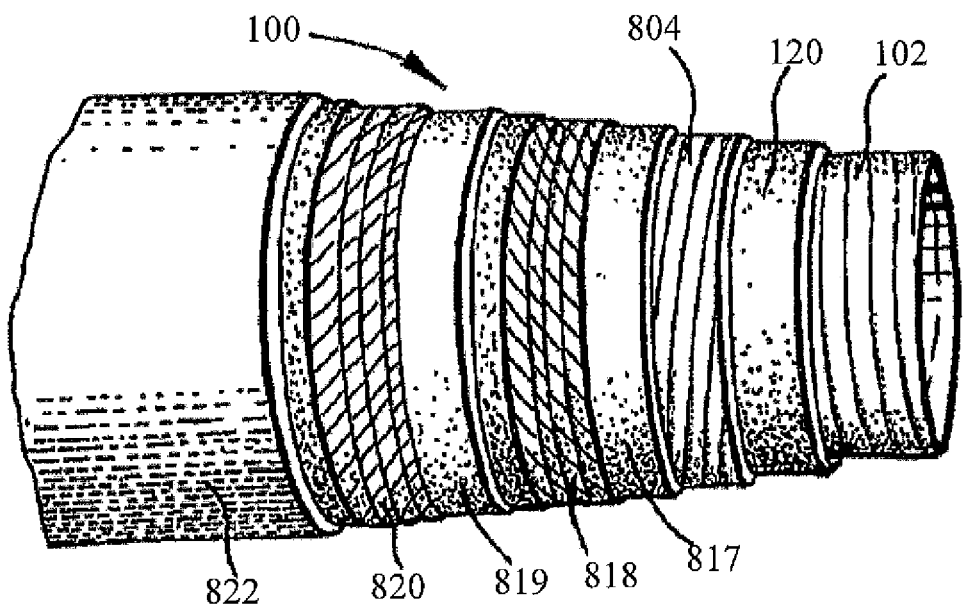
FIG. 3 is a perspective view of a multi-layer pipe section having a metal hollow core and unbonded barrier layer in accordance with one embodiment of the present disclosure.
Figure 4:
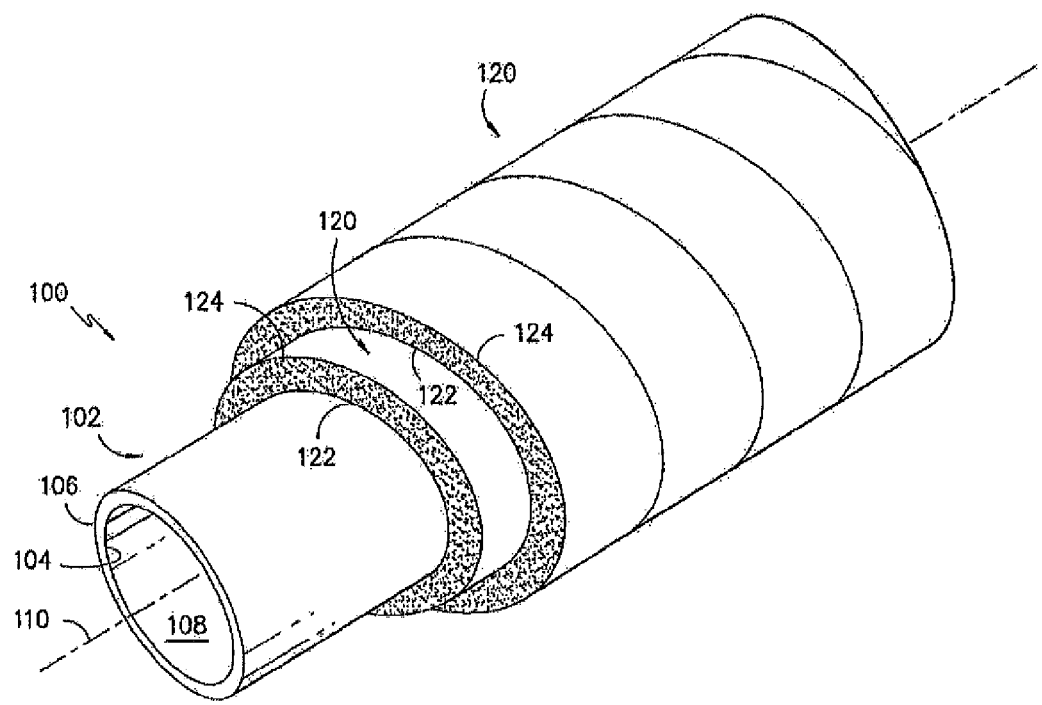
FIG. 4 is a perspective view of multi-layer pipe section having a polymer hollow core and unbonded barrier layer in accordance with another embodiment of the present disclosure.
Figure 5:
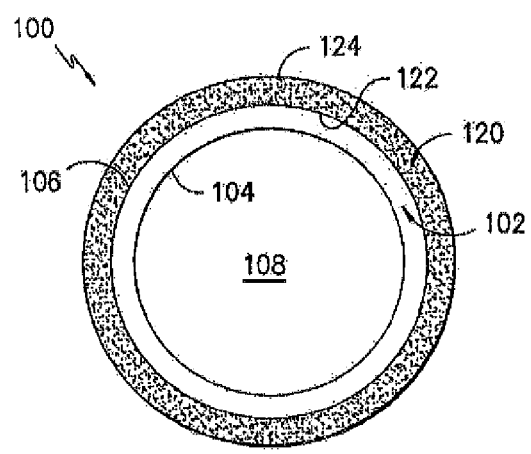
FIG. 5 is a cross-sectional view of a multi-layer pipe section having a polymer hollow core bonded to a barrier layer in accordance with one embodiment of the present disclosure.
Figure 6:
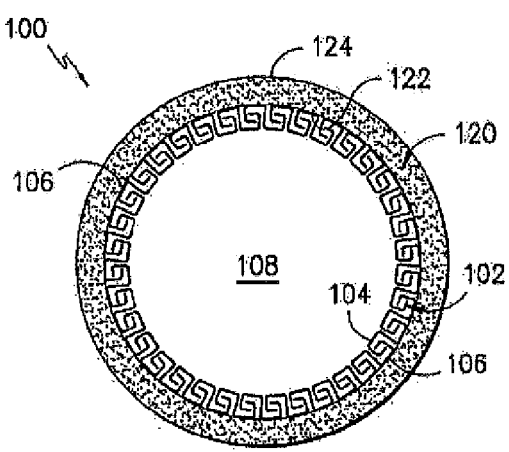
FIG. 6 is a cross-sectional view of a multi-layer pipe section having a metal hollow core bonded to a barrier layer in accordance with another embodiment of the present disclosure.

The hollow body 102 may be formed from any suitable material, which may be chosen based on the application and environment to which the pipe section 100 is to be exposed. In some embodiments, for example, the hollow body 102 may be formed from a polyarylene sulfide composition. In other embodiments, the hollow body 102 may be formed from other suitable polymer materials, which in exemplary embodiments may be thermoplastic materials. For example, other suitable thermoplastic polymers for use in the hollow body 102 may include, for instance, polyolefins (e.g., polypropylene, propylene-ethylene copolymers, etc.), polyesters (e.g., polybutylene terephalate ("PBT")), polycarbonates, polyamides (e.g., PA12, Nylon™) polyether ketones (e.g., polyether ether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoroalkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. FIGS. 4 and 5 illustrate a hollow body formed from a polymer material. The polymer material may be extruded to form the hollow body 102, or otherwise manipulated into the shape of the hollow body 102 as desired or required. In still other embodiments, as shown in FIGS. 3 and 6, the hollow body 102 may be formed from a metal, including metal alloys and superalloys. Steels, such as stainless steel and carbon-based steel, and aluminums are examples of suitable metals for use in a hollow body 102. The metal material formed into a hollow body 102 may be a metal sheet, or may comprise interlocking strips or wires as shown in FIG. 6, which may provide the metal hollow body 102 with increased flexibility, or may have any other suitable configuration. In some embodiments, the interlocking strips or wires can have, for example, an S- or Z-cross-sectional configuration, such that adjacent windings interlock with one another to form a stronger layer.

Hollow bodies 102 formed from polymer materials according to the present disclosure may be reinforced or unreinforced. A reinforced hollow body 102 may include a plurality of fibers dispersed in the polymer material forming the hollow body 920. The fibers may be long fibers or continuous fibers. As used therein, the term "long fibers" generally refers to fibers, filaments, yarns, or rovings that are not continuous, and as opposed to "continuous fibers" which generally refer to fibers, filaments, yarns, or rovings having a length that is generally limited only by the length of a part. The fibers dispersed in the polymer material to form the hollow body 920 may be formed from any conventional material known in the art, such as metal fibers, glass fibers (e.g., E-glass, A-glass, C-glass, D-glass, AR-glass, R-glass, S-glass such as S1-glass or S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing polymer compositions. Glass fibers and carbon fibers are particularly desirable.

A pipe section 102 according to the present disclosure further includes one or more barrier layers 120. Each barrier layer 120 may generally surround the hollow body 102. The innermost barrier layer 120 (relative to the hollow body 102) may be in contact with the hollow body 102, and surrounding outer barrier layers 120 may each be in contact with the neighboring barrier layer 120, as shown for example in FIG. 4. A barrier layer 120 has an inner surface 122 and an outer surface 124. When the innermost barrier layer 120 surrounds the hollow body 102, the inner surface 122 may contact the hollow body 102, such as the outer surface 106 thereof.

In some embodiments, multiple barrier layers 120 may bonded to each other and/or to the hollow body 102, as shown in FIGS. 5 and 6, while in other embodiments, the barrier layers 120 and hollow body 102 may be unbonded, as shown in FIGS. 3 and 4. Bonding of the barrier layers 120 and hollow body 102 may involve heating the barrier layers 120 and the hollow body 102, to consolidation temperatures. Heating may be performed in a die, heater, or otherwise during formation of a barrier layer 120 or tape thereof, or may be separately performed. A suitable heating source may be, for example, infrared, hot gas, laser, or otherwise. A consolidation temperature is a temperature that allows the neighboring barrier layers 120 and/or hollow body 102 to consolidate and thus be bonded together. For example, the consolidation temperature for a particular polymer resin may be the melting point temperature, or a temperature between approximately 20° C., 15° C., 10° C., or 5° C. below the melting point temperature and the melting point temperature for that polymer resin. Bonding may further include consolidating the hollow body 102 and the barrier layer 120 or the barrier layers 120 together. Consolidation may involve, for example, pressing the hollow body 102 and barrier layers 120 together, or simply allowing the hollow body 102 and barrier layers 120 to remain in contact, after heating thereof. Bonding may further include cooling the resulting pipe section 100 after consolidation, and thus bonding, of the hollow body 102 and barrier layer 120.

As discussed above and in detail below, a barrier layer 120 according to the present disclosure is formed from a polyarylene sulfide composition as discussed herein. The polyarylene sulfide composition further may include a plurality of fibers or other fillers embedded therein. Any suitable fibers as discussed above with respect to the hollow body 102 may be utilized in a fiber reinforced polyarylene sulfide composition. Further, in one embodiment, continuous fibers may be utilized in in the barrier layer 120. In exemplary embodiments, the continuous fibers may be generally unidirectional. Further, in exemplary embodiments, the barrier layer 120 is formed from a tape that includes the polyarylene sulfide composition, which may be fiber reinforced. In other embodiments, the barrier layer 120 may, for example, be extruded over the hollow body 102.

The polyarylene sulfide composition can be formed according to a melt processing technique that includes combining a polyarylene sulfide with an impact modifier to form a mixture and subjecting the mixture to dynamic vulcanization. More specifically, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added. The polyfunctional crosslinking agent can react with the components of the mixture to form crosslinks in the composition, for instance within and between the polymer chains of the impact modifier.

Without being bound to any particular theory, it is believed that by adding the polyfunctional crosslinking agent to the polyarylene sulfide composition following distribution of the impact modifier throughout the polyarylene sulfide, interaction between the polyarylene sulfide, the impact modifier, and the crosslinking agent within the melt processing unit can be improved, leading to improved distribution of the crosslinked impact modifier throughout the composition. The improved distribution of the crosslinked impact modifier throughout the composition can improve the strength and flexibility characteristics of the composition, e.g., the ability of the composition to maintain strength under deformation, as well as provide a composition with good processibility that can be utilized to form a product that can exhibit excellent resistance to degradation under a variety of conditions.

According to one embodiment, a formation process can include functionalization of the polyarylene sulfide. This embodiment can provide additional sites for bonding between the impact modifier and the polyarylene sulfide, which can further improve distribution of the impact modifier throughout the polyarylene sulfide and further prevent phase separation. Moreover, functionalization of the polyarylene sulfide can include scission of the polyarylene sulfide chain, which can decrease the melt viscosity of the composition and improve processibility. This can also provide a polyarylene sulfide composition that is a low halogen, e.g., low chlorine composition that exhibits excellent physical characteristics and high resistance to degradation.

To provide further improvements to the polyarylene sulfide composition, the composition can be formed to include other conventional additives such as fillers, lubricants, colorants, etc. according to standard practice.

The high strength and flexibility characteristics of the polyarylene sulfide composition can be evident by examination of the tensile, flexural, and/or impact properties of the materials. For example, the polyarylene sulfide composition can have a notched Charpy impact strength of greater than about 3 $kJ/m^2$, greater than about 3.5 $kJ/m^2$, greater than about 5 $kJ/m^2$, greater than about 10 $kJ/m^2$, greater than about 15 kJ/m², greater than about 30 kJ/m², greater than about 33 kJ/m², greater than about 40 kJ/m², greater than about 45 kJ/m², or greater than about 50 kJ/m² as determined according to ISO Test No. 179-1 (technically equivalent to ASTM D256, Method B) at 23° C. The unnotched Charpy samples do not break under testing conditions of ISO Test No. 180 at 23° C. (technically equivalent to ASTM D256).

Beneficially, the polyarylene sulfide composition can maintain good physical characteristics even at extreme temperatures, including both high and low temperatures. For instance, the polyarylene sulfide composition can have a notched Charpy impact strength of greater than about 8 kJ/m², greater than about 9 kJ/m², greater than about 10 kJ/m², greater than about 14 kJ/m², greater than about 15 kJ/m², greater than about 18 kJ/m², or greater than about 20 kJ/m² as determined according to ISO Test No. 179-1 at −30° C.; and can have a notched Charpy impact strength of greater than about 8 kJ/m², greater than about 9 kJ/m², greater than about 10 kJ/m², greater than about 11 kJ/m², greater than about 12 kJ/m², or greater than about 15 kJ/m² as determined according to ISO Test No. 179-1 at −40° C.

Moreover, the effect of temperature change on the polyarylene sulfide composition can be surprisingly small. For instance, the ratio of the notched Charpy impact strength as determined according to ISO Test No. 179-1 at 23° C. to that at −30° C. can be greater than about 3.5, greater than about 3.6, or greater than about 3.7. Thus, and as described in more detail in the example section below, as the temperature increases the impact strength of the polyarylene sulfide composition also increases, as expected, but the rate of increase of the impact strength is very high, particularly as compared to a composition that does not include the dynamically crosslinked impact modifier. Accordingly, the polyarylene sulfide composition can exhibit excellent strength characteristics at a wide range of temperatures.

The polyarylene sulfide composition can exhibit very good tensile characteristics. For example, the polyarylene sulfide composition can have a tensile elongation at yield of greater than about 4.5%, greater than about 6%, greater than about 7%, greater than about 10%, greater than about 25%, greater than about 35%, greater than about 50%, greater than about 70%, greater than about 75%, greater than about 80%, or greater than about 90%. Similarly, the tensile elongation at break can be quite high, for instance greater than about 10%, greater than about 25%, greater than about 35%, greater than about 50%, greater than about 70%, greater than about 75%, greater than about 80%, or greater than about 90%. The strain at break can be greater than about 5%, greater than about 15%, greater than about 20%, or greater than about 25%. For instance the strain at break can be about 90%. The yield strain can likewise be high, for instance greater than about 5%, greater than about 15%, greater than about 20%, or greater than about 25%. The yield stress can be, for example, greater than about 50% or greater than about 53%. The polyarylene sulfide composition may have a tensile strength at break of greater than about 30 MPa, greater than about 35 MPa, greater than about 40 MPa, greater than about 45 MPa, or greater than about 70 MPa.

In addition, the polyarylene sulfide composition can have a relatively low tensile modulus. For instance, the polyarylene sulfide composition can have a tensile modulus less than about 3000 MPa, less than about 2300 MPa, less than about 2000 MPa, less than about 1500 MPa, or less than about 1100 MPa as determined according to ISO Test No. 527 at a temperature of 23° C. and a test speed of 5 mm/min.

The polyarylene sulfide composition can exhibit good characteristics after annealing as well. For instance, following annealing at a temperature of about 230° C. for a period of time of about 2 hours, the tensile modulus of the composition can be less than about 2500 MPa, less than about 2300 MPa, or less than about 2250 MPa. The tensile strength at break after annealing can be greater than about 50 MPa, or greater than about 55 MPa, as measured according to ISO Test No. 527 at a temperature of 23° C. and a test speed of 5 mm/min.

The polyarylene sulfide composition can also be utilized continuously at high temperature, for instance at a continuous use temperature of up to about 150° C., about 160° C., or about 165° C. without loss of tensile strength. For example, the polyarylene sulfide composition can maintain greater than about 95%, for instance about 100% of the original tensile strength after 1000 hours of heat aging at 165° C. and can maintain greater than about 95%, for instance about 100% of the original tensile elongation at yield after 1000 hours heat aging at 135° C.

Tensile characteristics can be determined according to ISO Test No. 527 at a temperature of 23° C. and a test speed of 5 mm/min or 50 mm/min (technically equivalent to ASTM D623 at 23° C.).

The flexural characteristics of the composition can be determined according to ISO Test No. 178 (technically equivalent to ASTM D790 at a temperature of 23° C. and a testing speed of 2 mm/min. For example, the flexural modulus of the composition can be less than about 2500 MPa, less than about 2300 MPa, less than about 2000 MPa, less than about 1800 MPa, or less than about 1500 MPa. The polyarylene sulfide composition may have a flexural strength at break of greater than about 30 MPa, greater than about 35 MPa, greater than about 40 MPa, greater than about 45 MPa, or greater than about 70 MPa.

The deflection temperature under load of the polyarylene sulfide composition can be relatively high. For example, the deflection temperature under load of the polyarylene sulfide composition can be greater than about 80° C., greater than about 90° C., greater than about 100° C., or greater than about 105° C., as determined according to ISO Test No. 75-2 (technically equivalent to ASTM D790) at 1.8 MPa.

The Vicat softening point can be greater than about 200° C. or greater than about 250° C., for instance about 270° C. as determined according to the Vicat A test when a load of 10 N is used at a heating rate of 50 K/hr. For the Vicat B test, when a load of 50 N is used at a heating rate of 50 K/hr, the Vicat softening point can be greater than about 100° C., greater than about 150° C. greater than about 175° C., or greater than about 190° C., for instance about 200° C. The Vicat softening point can be determined according to ISO Test No. 306 (technically equivalent to ASTM D1525).

The polyarylene sulfide composition can also exhibit excellent stability during long term exposure to harsh environmental conditions. For instance, under long term exposure to an acidic environment, the polyarylene sulfide composition can exhibit little loss in strength characteristics. For instance, following 500 hours exposure to a strong acid (e.g., a solution of about 5% or more strong acid such as sulfuric acid, hydrochloric acid, nitric acid, perchloric acid, etc.), the polyarylene sulfide composition can exhibit a loss in Charpy notched impact strength of less than about 17%, or less than about 16% following exposure of about 500 hours to a strong acid solution at a temperature of about 40° C., and can exhibit a loss in Charpy notched impact strength of less than about 25%, or less than about 22% following exposure of about 500 hours to a strong acid solution at a temperature of about 80° C. Even under harsher conditions, for instance in a 10% sulfuric acid solution held at a temperature of about 80° C. for 1000 hours, the polyarylene sulfide composition can maintain about 80% or more of the initial Charpy notched impact strength. The polyarylene sulfide composition can also maintain desirable strength characteristics following exposure to other potentially degrading materials, such as salts.

Permeation resistance can be important for a wide variety of applications for the polyarylene sulfide composition, for instance when utilizing the composition in formation of fuel lines, storage tanks, or the like. The polyarylene sulfide composition can exhibit excellent permeation resistance to a wide variety of materials. For instance, a shaped product formed of the polyarylene sulfide composition can exhibit a permeation resistance to a fuel or a fuel source (e.g., gasoline, diesel fuel, jet fuel, unrefined or refined oil, etc.) of less than about 3 g-mm/m$^2$-day, less than about 2 g-mm/m$^2$-day, less than about 1 g-mm/m$^2$-day, or less than about 0.5 g-mm/m$^2$-day. By way of example, the polyarylene sulfide composition (or a product formed of the polyarylene sulfide composition) can exhibit a permeation resistance to an ethanol blend of ethanol/iso-octane/toluene at a weight ratio of 10:45:45 at 40° C. of less than about 3 g-mm/m$^2$-day, less than about 2.5 g-mm/m$^2$-day, less than about 1 g-mm/m$^2$-day, or less than about 0.1 g-mm/m$^2$-day. The permeation resistance to a blend of 15 wt. % methanol and 85 wt. % oxygenated fuel (CM15A) at 40° C. can be less than about 3 g-mm/m$^2$-day, less than about 2.5 g-mm/m$^2$-day, less than about 1 g-mm/m$^2$-day, less than about 0.5 g-mm/m$^2$-day, less than about 0.3 g-mm/m$^2$-day, or less than about 0.15 g-mm/m$^2$-day. The permeation resistance to methanol at 40° C. can be less than about 1 g-mm/m$^2$-day, less than about 0.5 g-mm/m$^2$-day, less than about 0.25 g-mm/m$^2$-day, less than about 0.1 g-mm/m$^2$-day, or less than about 0.06 g-mm/m$^2$-day. Permeation resistance can be determined according to SAE Testing Method No. J2665. In addition, the polyarylene sulfide composition can maintain original density following long term exposure to hydrocarbons. For example, the composition can maintain greater than about 95% of original density, greater than about 96% of original density, such as about 99% of original density following long term (e.g., greater than about 14 days) exposure to hydrocarbons such as heptane, cyclohexane, toluene, and so forth, or combinations of hydrocarbons.

The polyarylene sulfide composition can also be resistant to uptake of materials, and specifically hydrocarbons. For example, a molded structure formed of the composition can exhibit a volume change of less than about 25%, less than about 20%, or less than about 14% following exposure to the hydrocarbon at a temperature of 130° C. for a period of time of about two weeks.

The polyarylene sulfide composition can exhibit good heat resistance and flame retardant characteristics. For instance, the composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
|---|---|---|---|
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.2 millimeters.

The polyarylene sulfide composition can also exhibit good processing characteristics, for instance as demonstrated by the melt viscosity of the composition. For instance, the polyarylene sulfide composition can have a melt viscosity of less than about 2800 poise as measured on a capillary rheometer at 316° C. and 400 sec$^{-1}$ with the viscosity measurement taken after five minutes of constant shear. Moreover, the polyarylene sulfide composition can exhibit improved melt stability over time as compared to polyarylene sulfide compositions that do not include crosslinked impact modifiers. Polyarylene sulfide compositions that do not include a crosslinked impact modifier tend to exhibit an increase in melt viscosity over time, and in contrast, disclosed compositions can maintain or even decrease in melt viscosity over time.

The polyarylene sulfide composition can have a complex viscosity as determined at low shear (0.1 radians per second (rad/s)) and 310° C. of greater than about 10 kPa/sec, greater than about 25 kPa/sec, greater than about 40 kPa/sec, greater than about 50 kPa/sec, greater than about 75 kPa/sec, greater than about 200 kPa/sec, greater than about 250 kPa/sec, greater than about 300 kPa/sec, greater than about 350 kPa/sec, greater than about 400 kPa/sec, or greater than about 450 kPa/sec. Higher value for complex viscosity at low shear is indicative of the crosslinked structure of the composition and the higher melt strength of the polyarylene sulfide composition. In addition, the polyarylene sulfide composition can exhibit high shear sensitivity, which indicates excellent characteristics for use in formation processes such as blow molding and extrusion processing.

Figure 7:
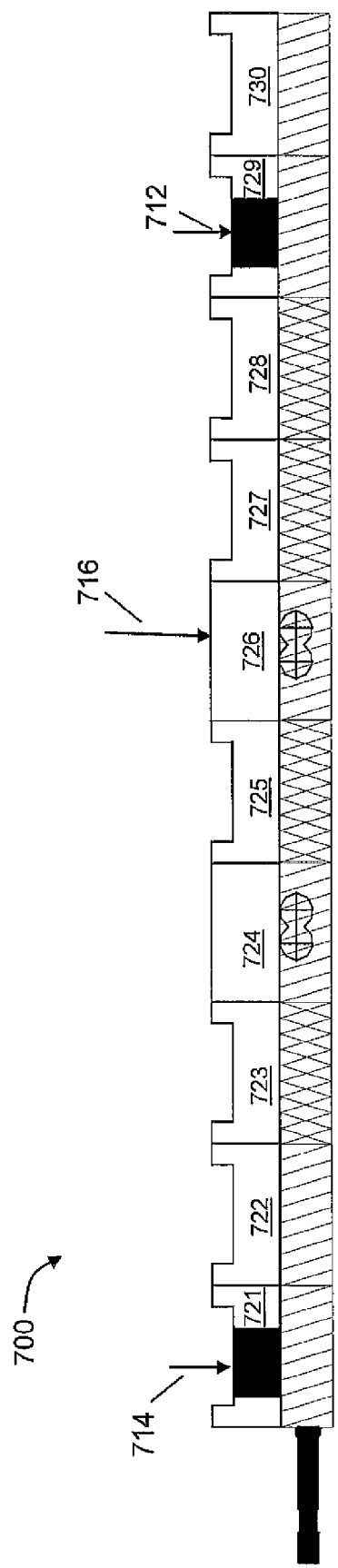
FIG. 7 is a schematic representation of a process for forming a polyarylene sulfide composition in accordance with one embodiment of the present disclosure.

FIG. 7 illustrates a schematic of a process that can be used in forming the polyarylene sulfide composition. As illustrated, the components of the polyarylene sulfide composition may be melt-kneaded in a melt processing unit such as an extruder 700. Extruder 700 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 700 that includes multiple zones or barrels. In the illustrated embodiment, extruder 700 includes 10 barrels numbered 721-730 along the length of the extruder 700, as shown. Each barrel 721-730 can include feed lines 714, 716, vents 712, temperature controls, etc. that can be independently operated. A general purpose screw design can be used to melt process the polyarylene composition. By way of example, a polyarylene sulfide composition may be melt mixed using a twin screw extruder such as a Coperion co-rotating fully intermeshing twin screw extruder.

In forming a polyarylene sulfide composition, the polyarylene sulfide can be fed to the extruder 700 at a main feed throat 714. For instance, the polyarylene sulfide may be fed to the main feed throat 714 at the first barrel 721 by means of a metering feeder. The polyarylene sulfide can be melted and mixed with the other components of the composition as it progresses through the extruder 700. The impact modifier can be added to the composition in conjunction with the polyarylene sulfide composition at the main feed throat 714 or downstream of the main feed throat, as desired.

At a point downstream of the main feed throat 714, and following addition of the impact modifier to the composition, the crosslinking agent can be added to the composition. For instance, in the illustrated embodiment, a second feed line 716 at barrel 726 can be utilized for addition of the crosslinking agent. The point of addition for the crosslinking agent is not particularly limited. However, the crosslinking agent can be added to the composition at a point after the polyarylene sulfide has been mixed with the impact modifier under shear such that the impact modifier is well distributed throughout the polyarylene sulfide.

The polyarylene sulfide may be a polyarylene thioether containing repeat units of the formula (I):

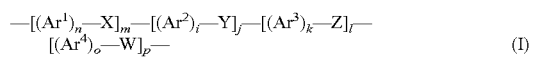

(I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —$(C_6H_4—S)_n$— (wherein n is an integer of 1 or more) as a component thereof.

The polyarylene sulfide may be synthesized prior to forming the polyarylene sulfide composition, though this is not a requirement of a process, and a polyarylene sulfide can also be purchased from known suppliers. For instance Fortron® polyphenylene sulfide available from Ticona of Florence, Ky., USA can be purchased and utilized as the polyarylene sulfide. In those embodiments in which the polyarylene sulfide is synthesized, synthesis techniques that may be used are generally known in the art. By way of example, a process for producing a polyarylene sulfide can include reacting a material that provides a hydrosulfide ion, e.g., an alkali metal sulfide, with a dihaloaromatic compound in an organic amide solvent.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art.

The polyarylene sulfide composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the polyarylene sulfide composition. For instance, the melt viscosity of the polyarylene sulfide may be a low viscosity polyarylene sulfide, having a melt viscosity of less than about 500 poise, a medium viscosity polyarylene sulfide, having a melt viscosity of between about 500 poise and about 1500 poise, or a high melt viscosity polyarylene sulfide, having a melt viscosity of greater than about 1,500 poise, as determined in accordance with ISO Test No. 11443 at a shear rate of $1200\ s^{-1}$ and at a temperature of 310° C.

According to one embodiment, the polyarylene sulfide can be functionalized to further encourage bond formation between the polyarylene sulfide and the impact modifier. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the polyarylene sulfide composition formation process, and the polyarylene sulfide can be functionalized in conjunction with formation of the composition. For instance, a disulfide compound containing the desired reactive functional groups can be added to the melt extruder in conjunction with the polyarylene sulfide or at any other point prior to or in conjunction with the addition of the crosslinking agent.

Reaction between the polyarylene sulfide polymer and the reactively functionalized disulfide compound can include chain scission of the polyarylene sulfide polymer that can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be suitable for further processing, and the overall halogen content of the low melt viscosity polyarylene sulfide can be quite low. A polyarylene sulfide composition that exhibits excellent strength and degradation resistance in addition to low halogen content can be advantageous as low halogen content polymeric materials are becoming increasingly desired due to environmental concerns. In one embodiment, the polyarylene sulfide composition can have a halogen content of less than about 1000 ppm, less than about 900 ppm, less than about 600 ppm, or less than about 400 ppm as determined according to an elemental analysis using Parr Bomb combustion followed by Ion Chromatography.

The disulfide compound can generally have the structure of:

$$R^1\text{—S—S—}R^2$$

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

The ratio of the amount of the polyarylene sulfide to the amount of the disulfide compound can be from about 1000:1 to about 10:1, from about 500:1 to about 20:1, or from about 400:1 to about 30:1.

In addition to the polyarylene sulfide polymer, the composition also includes an impact modifier. More specifically, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent. For instance, the impact modifier can be modified with a mole fraction of from about 0.01 to about 0.5 of one or more of the following: an α,β unsaturated dicarboxylic acid or salt thereof having from about 3 to about 8 carbon atoms; an α,β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl(meth)acrylate-maleic anhydride terpolymers, ethylene-alkyl(meth)acrylate-glycidyl (meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched—olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

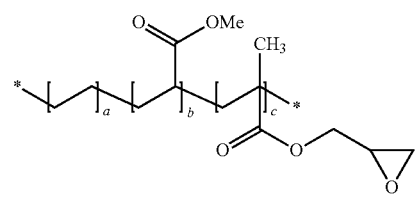

wherein, a, b, and c are 1 or greater.

In another embodiment the impact modifier can be a random copolymer of ethylene, ethyl acrylate and maleic anhydride having the following structure:

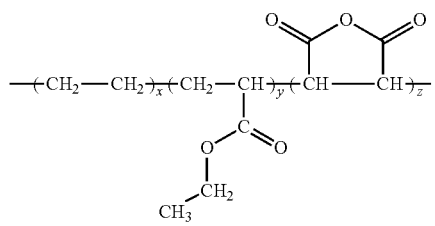

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An a-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, the impact modifier may be present in the composition in an amount from about 0.05% to about 40% by weight, from about 0.05% to about 37% by weight, or from about 0.1% to about 35% by weight.

Referring again to FIG. 7, the impact modifier can be added to the composition in conjunction with the polyarylene sulfide composition at the main feed throat 714 of the melt processing unit. This is not a requirement of the composition formation process, however, and in other embodiments, the impact modifier can be added downstream of the main feed throat. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In addition to the polyarylene sulfide and the impact modifier, the polyarylene composition can include a crosslinking agent. The crosslinking agent can be a polyfunctional compound or combination thereof that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho-di-, tri- and/or tetra-alkyl-substituted 4,4'-diaminodiphenyl-methanes, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho-di-, tri- and/or tetra-alkyl-substituted 4,4'-diaminodiphenyl-methanes.

In one embodiment, the composition can include a disulfide-free crosslinking agent. For example, the crosslinking agent can include carboxyl and/or amine functionality with no disulfide group that may react with the polyarylene sulfide. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with the impact modifier as well as with the reactively functionalized polyarylene sulfide. Thus, the composition can be highly crosslinked without excessive scission of the polyarylene sulfide polymer chains.

In another embodiment the crosslinking agent and the polyarylene sulfide functionalization compound (when present) can be selected so as to encourage chain scission of the polyarylene sulfide. This may be beneficial, for instance, which chain scission is desired to decrease the melt viscosity of the polyarylene sulfide polymer.

The polyarylene sulfide composition may generally include the crosslinking agent in an amount from about 0.05 wt. % to about 2 wt. % by weight of the polyarylene sulfide composition, from about 0.07 wt. % to about 1.5 wt. % by weight of the polyarylene sulfide composition, or from about 0.1 wt. % to about 1.3 wt. %.

The crosslinking agent can be added to the melt processing unit following mixing of the polyarylene sulfide and the impact modifier. For instance, as illustrated in FIG. 7, the crosslinking agent can be added to the composition at a downstream location 716 following addition of polyarylene sulfide and the impact modifier (either together or separately) to the melt processing unit. This can ensure that the impact modifier has become dispersed throughout the polyarylene sulfide prior to addition of the crosslinking agent.

To help encourage distribution of the impact modifier throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and impact modifier distribution. For example, the L/D value after the point at which the impact modifier is supplied may be controlled to encourage distribution of the impact modifier. More particularly, the screw has a blending length ("$L_B$") that is defined from the point at which both the impact modifier and the polyarylene sulfide are supplied to the unit (i.e., either where they are both supplied in conjunction with one another or the point at which the latter of the two is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the $L/L_B$ ratio can be from about 40 to about 1.1, from about 20 to about 2, or from about 10 to about 5.

Following addition of the crosslinking agent, the composition can be mixed to distribute the crosslinking agent throughout the composition and encourage reaction between the crosslinking agent, the impact modifier, and, in one embodiment, with the polyarylene sulfide.

The composition can also include one or more additives as are generally known in the art. For example, one or more fillers can be included in the polyarylene sulfide composition. One or more fillers may generally be included in the polyarylene sulfide composition an amount of from about 5 wt. % to about 70 wt. %, or from about 20 wt. % to about 65 wt. % by weight of the polyarylene sulfide composition.

The filler can be added to the polyarylene sulfide composition according to standard practice. For instance, the filler can be added to the composition at a downstream location of the melt processing unit. For example, a filler may be added to the composition in conjunction with the addition of the crosslinking agent. However, this is not a requirement of a formation process and the filler can be added separately from the crosslinking agent and either upstream or downstream of the point of addition of the crosslinking agent. In addition, a filler can be added at a single feed location, or may be split and added at multiple feed locations along the melt processing unit.

In one embodiment, a fibrous filler can be included in the polyarylene sulfide composition. The fibrous filler may include one or more fiber types including, without limitation, polymer fibers, glass fibers, carbon fibers, metal fibers, basalt fibers, and so forth, or a combination of fiber types.

In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the polyarylene sulfide composition. In general, particulate fillers can encompass any particulate material having a median particle size of less than about 750 µm, for instance less than about 500 µm, or less than about 100 µm. In one embodiment, a particulate filler can have a median particle size in the range of from about 3 µm to about 20 µm. In addition, a particulate filler can be solid or hollow, as is known. Particulate fillers can also include a surface treatment, as is known in the art.

Particulate fillers can encompass one or more mineral fillers. For instance, the polyarylene sulfide composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

A filler can be an electrically conductive filler such as, without limitation, carbon black, graphite, graphene, carbon fiber, carbon nanotubes, a metal powder, and so forth. In those embodiments in which the polyarylene sulfide composition includes electrically conductive fillers, for instance when the polyarylene sulfide composition is utilized in forming a fuel line, adequate electrically conductive filler can be included such that the composition has a volume specific resistance of equal to or less than about $10^9$ ohms cm.

In one embodiment, the polyarylene sulfide composition can include a UV stabilizer as an additive. For instance, the polyarylene sulfide composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit. One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a polyarylene sulfide composition is one or more colorants as are generally known in the art. For instance, the polyarylene sulfide composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, 3$^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes.

Pigments that can be incorporated in a polyarylene sulfide composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the polyarylene sulfide composition can encompass, without limitation, antimicrobials, lubricants, pigments or other colorants, impact modifiers, antioxidants, stabilizers (e.g., heat stabilizers including organophosphites such as Doverphos® products available from Dover Chemical Corporation), surfactants, flow promoters, solid solvents, and other materials added to enhance properties and processability. Such optional materials may be employed in the polyarylene sulfide composition in conventional amounts and according to conventional processing techniques, for instance through addition to the polyarylene sulfide composition at the main feed throat. Beneficially, the polyarylene sulfide composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the polyarylene sulfide composition, the composition is thoroughly mixed in the remaining section(s) of the extruder and extruded through a die. The final extrudate can be pelletized or otherwise shaped as desired, for instance the final extrudate can be in the form of a pultruded tape or ribbon.

Conventional shaping processes can be used for forming a barrier layer out of the polyarylene sulfide composition including, without limitation, extrusion, injection molding, thermoforming, compression molding, hot-stamping, and so forth.

At least a barrier layer for a pipe as may be utilized for carrying liquids or gases, and in one particular embodiment heated liquids or gases, may be formed from the polyarylene sulfide composition. The pipe may be single-layered or multi-layered. Typical conventional extrusion or molding processes may be used for forming the pipe. For instance, either single or multi-screw extruders may be used for extrusion of a pipe layer.

A barrier layer can be formed according to an extrusion process. For example, an extrusion process utilizing a simple or barrier type screw can be utilized and, in one embodiment, a mixing tip need not be utilized in the process. The compression ratio for an extrusion process can be between about 2.5:1 and about 4:1. For instance, the compression ratio can be about 25% feed, about 25% transition, and about 50% metering. The ratio of the barrel length to the barrel diameter (L/D) can be from about 16 to about 24. An extrusion process can also utilize other standard components as are known in the art such as, for example, breaker plates, screen packs, adapters, a die, and a vacuum tank. The vacuum tank can generally include a sizing sleeve/calibration ring, tank seals, and the like.

When forming a barrier layer according to an extrusion process, the polyarylene sulfide composition can first be dried, for instance at a temperature of from about 90° C. to about 100° C. for about three hours. It may be beneficial to avoid drying for an extensive length of time so as to avoid discoloration of the composition. The extruder can exhibit different temperatures in different zones, as is known. For instance, in one embodiment, the extruder can include at least four zones, with the temperature of the first zone from about 276° C. to about 288° C., the temperature of the second zone from about 282° C. to about 299° C., the temperature of the third zone from about 282° C. to about 299° C., and the temperature of the fourth zone from about 540° C. to about 580° C. Meanwhile, the temperature of the die can be from about 293° C. to about 310° C., and the vacuum tank water can be from about 20° C. to about 50° C.

Typically, the head pressure can be from about 100 pounds per square inch (psi) (about 690 kPa) to about 1000 psi (about 6900 kPa), and the head pressure can be adjusted to achieve a stable melt flow, as is known. For instance, the head pressure can be reduced by increasing the extruder zone temperature, by increasing the extruder screw rotations per minute, reducing the screen pack mesh size and/or the number of screens, and so forth. In general, the line speed can be from about 4 meters per minute to about 15 meters per minute. Of course, the actual line speed can depend upon the final dimension of the final product, the aesthetics of the final product and process stability.

The die swell during an extrusion process can generally be negligible. A draw down of about 1.2 to about 1.7 can generally be utilized, as a higher draw down can negatively affect the final properties of the product, depending on other processing conditions. Die drool can generally be avoided by drying the resin adequately prior to extrusion as well as by maintaining the melt temperature at less than about 304° C.

In one embodiment, a barrier layer of a pipe extruded from the polyarylene sulfide composition can have a wall thickness of between about 0.5 millimeters to about 5 millimeters, though barrier layers having larger wall thickness can be formed from the composition as desired. The calibration ring inner diameter can decide the outer diameter of the barrier layer and will generally be less than the outer diameter of the die, as is known. The inner diameter of the barrier layer can be utilized to determine the desired outer diameter of the mandrel and the line speed, as is known.

Referring again to FIGS. 3 and 4, a barrier layer 120 can be formed of a tape, such as a tape 152 or tape 156 as discussed with regard to FIG. 8 below, formed from the polyarylene sulfide composition, which in exemplary embodiments is fiber reinforced. The tape may be wrapped around hollow body 102 to surround the hollow body 102. For example, in some exemplary embodiments, the tape may be wrapped around the hollow body 102 generally helically with respect to the longitudinal axis 110 of the hollow body 102.

A tape may be formed using any suitable process or apparatus. Exemplary embodiments of suitable processes and apparatus, such as pultrusion processes and apparatus, for forming a tape that may be a barrier layer 120 according to the present disclosure are discussed in detail below.

Figure 8:
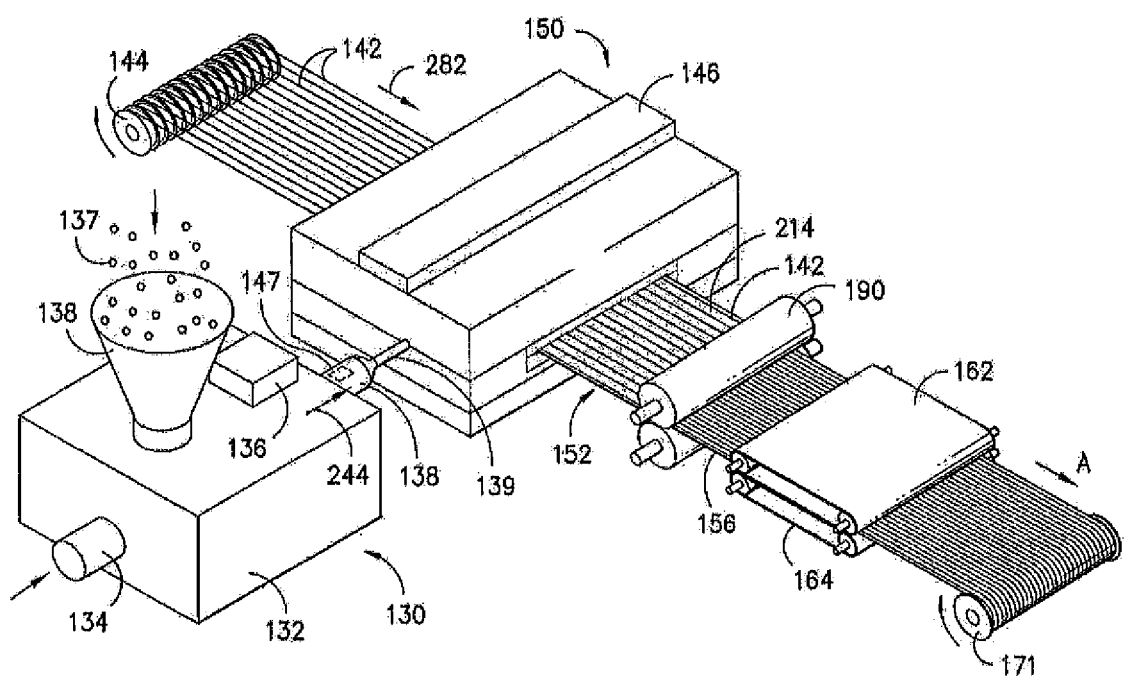
FIG. 8 is a schematic illustration of an impregnation system in accordance with one embodiment of the present disclosure.

Referring to FIG. 8, one embodiment of such an extrusion device is shown. More particularly, the apparatus includes an extruder 130 containing a screw shaft 134 mounted inside a barrel 132. A heater 136 (e.g., electrical resistance heater) is mounted outside the barrel 132. During use, a feedstock 137 is supplied to the extruder 130 through a hopper 138. The feedstock is formed from the polyarylene sulfide composition. The feedstock 137 is conveyed inside the barrel 132 by the screw shaft 134 and heated by frictional forces inside the barrel 132 and by the heater 136. Upon being heated, the feedstock 137 exits the barrel 132 through a barrel flange 138 and enters a die flange 139 of an impregnation die 150.

A continuous fiber roving 142 or a plurality of continuous fiber rovings 142 are supplied from a reel or reels 144 to die 150. The rovings 142 are generally positioned side-by-side, with minimal to no distance between neighboring rovings, before impregnation. The feedstock 137 may further be heated inside the die by heaters 146 mounted in or around the die 150. The die is generally operated at temperatures that are sufficient to cause and/or maintain the proper melt temperature for the polyarylene sulfide composition, thus allowing for the desired level of impregnation of the rovings by the polyarylene sulfide composition. Typically, the operation temperature of the die is higher than the melt temperature of the polyarylene sulfide composition, such as at temperatures from about 200° C. to about 450° C. When processed in this manner, the continuous fiber rovings 142 become embedded in the polyarylene sulfide composition, which may be a resin 214 processed from the feedstock 137. The mixture may then exit the impregnation die 150 as wetted composite, extrudate, or tape 152.

As used herein, the term "roving" generally refers to a bundle of individual fibers 300. The fibers 300 contained within the roving can be twisted or can be straight. The rovings may contain a single fiber type or different types of fibers 300. Different fibers may also be contained in individual rovings or, alternatively, each roving may contain a different fiber type. The continuous fibers employed in the rovings possess a high degree of tensile strength relative to their mass. For example, the ultimate tensile strength of the fibers is typically from about 1,000 to about 15,000 Megapascals ("MPa"), in some embodiments from about 2,000 MPa to about 10,000 MPa, and in some embodiments, from about 3,000 MPa to about 6,000 MPa. Such tensile strengths may be achieved even though the fibers are of a relatively light weight, such as a mass per unit length of from about 0.05 to about 2 grams per meter, in some embodiments from about 0.4 to about 1.5 grams per meter. The ratio of tensile strength to mass per unit length may thus be about 1,000 Megapascals per gram per meter ("MPa/g/m") or greater, in some embodiments about 4,000 MPa/g/m or greater, and in some embodiments, from about 5,500 to about 20,000 MPa/g/m. Such high strength fibers may, for instance, be metal fibers, glass fibers (e.g., E-glass, A-glass, C-glass, D-glass, AR-glass, R-glass, S-glass such as S1-glass or S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic and/or thermoset compositions. Carbon fibers are particularly suitable for use as the continuous fibers, which typically have a tensile strength to mass ratio in the range of from about 5,000 to about 7,000 MPa/g/m. The continuous fibers often have a nominal diameter of about 4 to about 35 micrometers, and in some embodiments, from about 9 to about 35 micrometers. The number of fibers contained in each roving can be constant or vary from roving to roving. Typically, a roving contains from about 1,000 fibers to about 50,000 individual fibers, and in some embodiments, from about 5,000 to about 30,000 fibers.

A pressure sensor 147 may sense the pressure near the impregnation die 150 to allow control to be exerted over the rate of extrusion by controlling the rotational speed of the screw shaft 134, or the feed rate of the feeder. That is, the pressure sensor 147 is positioned near the impregnation die 150, such as upstream of the manifold assembly 220, so that the extruder 130 can be operated to deliver a correct amount of resin 214 for interaction with the fiber rovings 142. After leaving the impregnation die 150, impregnated rovings 142 or the extrudate or tape 152, which may comprises the fiber impregnated polyarylene sulfide composition, may enter an optional pre-shaping or guiding section (not shown) and/or a preheating device to control the temperature of the extrudate before entering a nip formed between two adjacent rollers 190. Although optional, the rollers 190 can help to consolidate the impregnated rovings 142 into a tape 156 or consolidate the tape 152 into a final tape 156, as well as enhance fiber impregnation and squeeze out any excess voids. In addition to the rollers 190, other shaping devices may also be employed, such as a die system. Regardless, the resulting consolidated tape 156 is pulled by tracks 162 and 164 mounted on rollers. The tracks 162 and 164 also pull the impregnated rovings 142 or tape 152 from the impregnation die 150 and through the rollers 190. If desired, the consolidated tape 156 may be wound up at a section 171. Generally speaking, the resulting tapes are relatively thin and typically have a thickness of from about 0.05 to about 1 millimeter, in some embodiments from about 0.1 to about 0.8 millimeters, and in some embodiments, from about 0.1 to about 0.4 millimeters.

Figure 9:
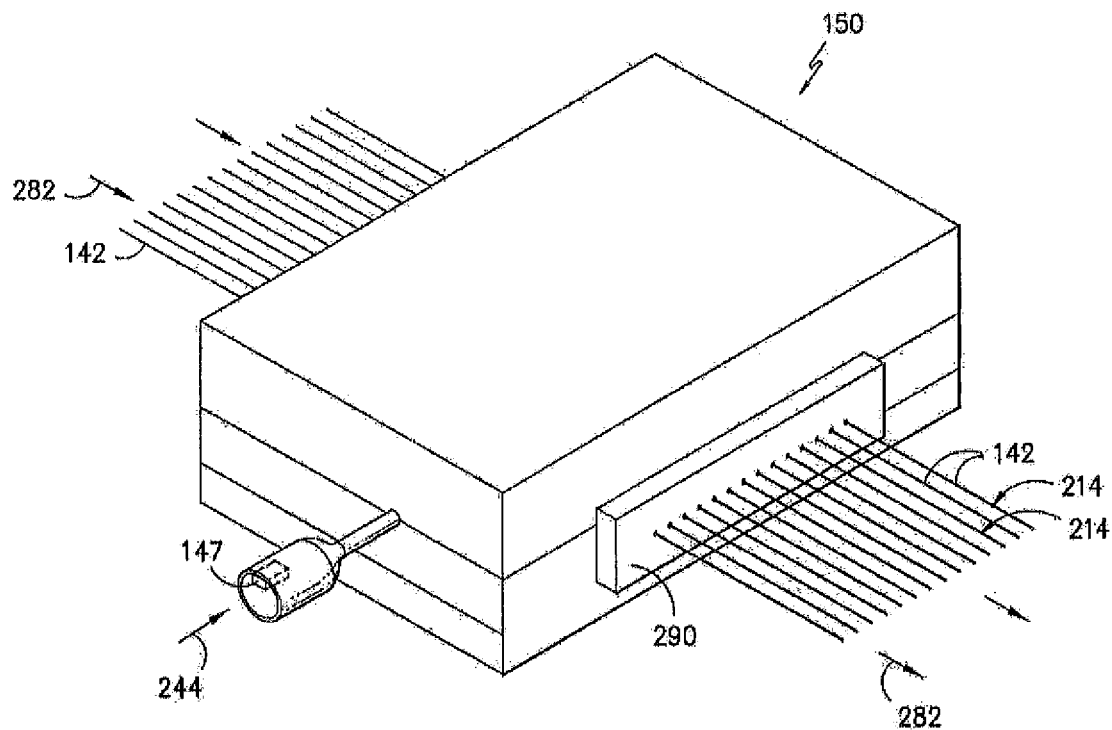
FIG. 9 is a perspective view of a die in accordance with one embodiment of the present disclosure.
Figure 10:
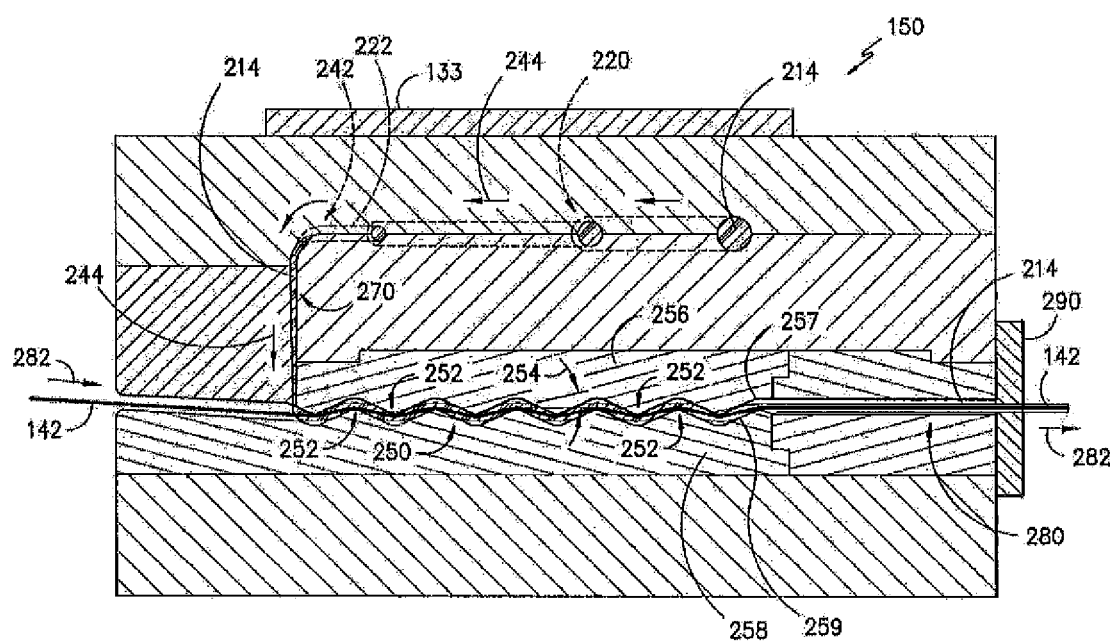
FIG. 10 is a cross-sectional view of the die shown in FIG. 9.

Perspective views of one embodiment of a die 150 according to the present disclosure are further shown in FIGS. 8 and 9. As shown, resin 214 is flowed into the die 150 as indicated by resin flow direction 244. The resin 214 is distributed within the die 150 and then interacted with the rovings 142. The rovings 142 are traversed through the die 150 in roving run direction 282, and are coated with resin 214. The rovings 142 are then impregnated with the resin 214, and these impregnated rovings 142 exit the die 150. In some embodiments, as shown in FIG. 10, the impregnated rovings 142 are connected by the resin 214 and thus exist as tape 152. In other embodiments, as shown in FIGS. 9 and 10, the impregnated rovings 142 exit the die separately, each impregnated within resin 214.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from tapes of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, pin, etc. The contact surfaces 252 are also typically made of a metal material.

FIG. 10 shows a cross-sectional view of an impregnation die 150. As shown, the impregnation die 150 includes a manifold assembly 220 and an impregnation section. The impregnation section includes an impregnation zone 250. In some embodiments, the impregnation section additionally includes a gate passage 270. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

Figure 11:
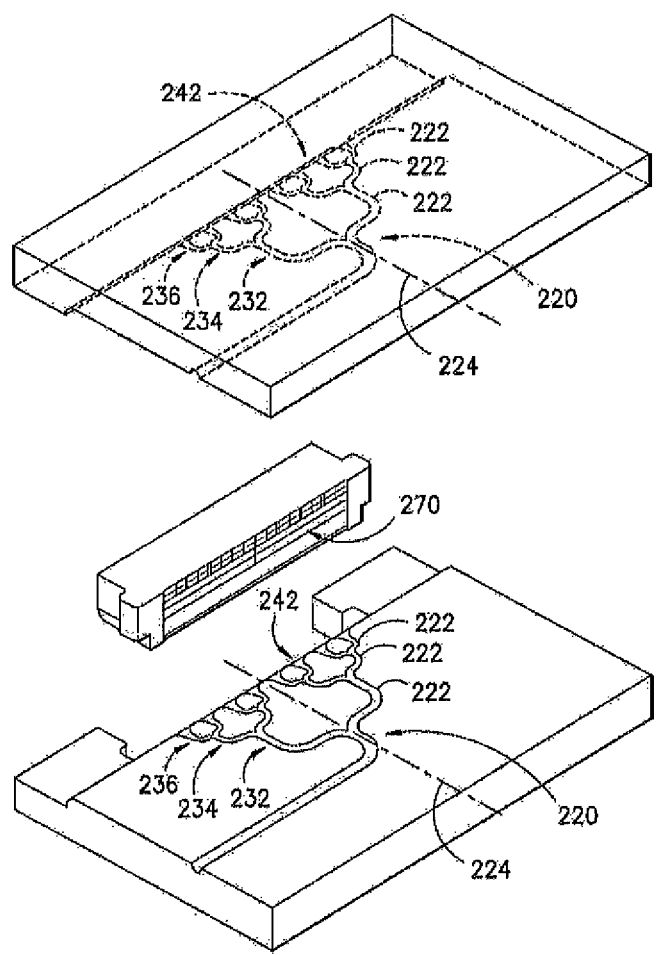
FIG. 11 is an exploded view of a manifold assembly and gate passage for a die in accordance with one embodiment of the present disclosure.

As shown in FIG. 11, in exemplary embodiments, at least a portion of each of the channels 222 may be curvilinear. The curvilinear portions may allow for relatively smooth redirection of the resin 214 in various directions to distribute the resin 214 through the manifold assembly 220, and may allow for relatively smooth flow of the resin 214 through the channels 222. Alternatively, the channels 222 may be linear, and redirection of the resin 214 may be through relatively sharp transition areas between linear portions of the channels 222. It should further be understood that the channels 222 may have any suitable shape, size, and/or contour.

The plurality of channels 222 may, in exemplary embodiments as shown in FIG. 11, be a plurality of branched runners 222. The runners 222 may include a first branched runner group 232. The first branched runner group 232 includes a plurality of runners 222 branching off from an initial channel or channels 222 that provide the resin 214 to the manifold assembly 220. The first branched runner group 232 may include 2, 3, 4 or more runners 222 branching off from the initial channels 222.

If desired, the runners 222 may include a second branched runner group 234 diverging from the first branched runner group 232, as shown. For example, a plurality of runners 222 from the second branched runner group 234 may branch off from one or more of the runners 222 in the first branched runner group 232. The second branched runner group 234 may include 2, 3, 4 or more runners 222 branching off from runners 222 in the first branched runner group 232.

If desired, the runners 222 may include a third branched runner group 236 diverging from the second branched runner group 234, as shown. For example, a plurality of runners 222 from the third branched runner group 236 may branch off from one or more of the runners 222 in the second branched runner group 234. The third branched runner group 236 may include 2, 3, 4 or more runners 222 branching off from runners 222 in the second branched runner group 234.

In some exemplary embodiments, as shown, the plurality of branched runners 222 has a symmetrical orientation along a central axis 224. The branched runners 222 and the symmetrical orientation thereof generally evenly distribute the resin 214, such that the flow of resin 214 exiting the manifold assembly 220 and coating the rovings 142 is substantially uniformly distributed on the rovings 142. This desirably allows for generally uniform impregnation of the rovings 142.

Further, the manifold assembly 220 may in some embodiments define an outlet region 242. The outlet region 242 is that portion of the manifold assembly 220 wherein resin 214 exits the manifold assembly 220. Thus, the outlet region 242 generally encompasses at least a downstream portion of the channels or runners 222 from which the resin 214 exits. In some embodiments, as shown, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142. Additionally or alternatively, various channels or runners 222 disposed in the outlet region 242 may have constant areas in the flow direction 244 of the resin 214, or may have decreasing areas in the flow direction 244 of the resin 214.

In some embodiments, as shown, each of the channels or runners 222 disposed in the outlet region 242 is positioned such that resin 214 flowing therefrom is combined with resin 214 from other channels or runners 222 disposed in the outlet region 242. This combination of the resin 214 from the various channels or runners 222 disposed in the outlet region 242 produces a generally singular and uniformly distributed flow of resin 214 from the manifold assembly 220 to substantially uniformly coat the rovings 142. Alternatively, various channels or runners 222 disposed in the outlet region 242 may be positioned such that resin 214 flowing therefrom is discrete from the resin 214 from other channels or runners 222 disposed in the outlet region 242. In these embodiments, a plurality of discrete but generally evenly distributed resin flows 214 may be produced by the manifold assembly 220 for substantially uniformly coating the rovings 142.

As shown in FIG. 10, at least a portion of the channels or runners 222 disposed in the outlet region 242 have curvilinear cross-sectional profiles. These curvilinear profiles allow for the resin 214 to be gradually directed from the channels or runners 222 generally downward towards the rovings 142. Alternatively, however, these channels or runners 222 may have any suitable cross-sectional profiles.

As further illustrated in FIGS. 10 and 11, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough.

In some embodiments, as shown in FIG. 10, the gate passage 270 extends vertically between the manifold assembly 220 and the impregnation zone 250. Alternatively, however, the gate passage 270 may extend at any suitable angle between vertical and horizontal such that resin 214 is allowed to flow therethrough.

Further, as shown in FIG. 10, in some embodiments at least a portion of the gate passage 270 has a decreasing cross-sectional profile in the flow direction 244 of the resin 214. This taper of at least a portion of the gate passage 270 may increase the flow rate of the resin 214 flowing therethrough before it contacts the rovings 142, which may allow the resin 214 to impinge on the rovings 142. Initial impingement of the rovings 142 by the resin 214 provides for further impregnation of the rovings, as discussed below. Further, tapering of at least a portion of the gate passage 270 may increase back-pressure in the gate passage 270 and the manifold assembly 220, which may further provide more even, uniform distribution of the resin 214 to coat the rovings 142. Alternatively, the gate passage 270 may have an increasing or generally constant cross-sectional profile, as desired or required.

Upon exiting the manifold assembly 220 and the gate passage 270 of the die 150 as shown in FIG. 10, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214. Impingement on the rovings 142 may be facilitated by the velocity of the resin 214 when it impacts the rovings 142, the proximity of the rovings 142 to the resin 214 when the resin exits the manifold assembly 220 or gate passage 270, or other various variables.

As shown in FIG. 10, the coated rovings 142 are traversed in run direction 282 through impregnation zone 250. The impregnation zone 250 is in fluid communication with the manifold assembly 220, such as through the gate passage 270 disposed therebetween. The impregnation zone 250 is configured to impregnate the rovings 142 with the resin 214.

For example, as discussed above, in exemplary embodiments as shown in FIGS. 10 and 12 through 14, the impregnation zone 250 includes a plurality of contact surfaces 252. The rovings 142 are traversed over the contact surfaces 252 in the impregnation zone. Impingement of the rovings 142 on the contact surface 252 creates shear and pressure sufficient to impregnate the rovings 142 with the resin 214 coating the rovings 142.

Figure 13:
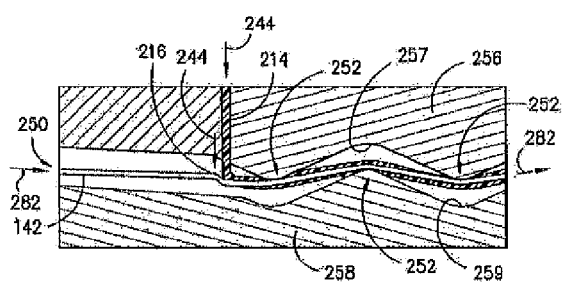
FIG. 13 is a close-up cross-sectional view of a portion of an impregnation zone in accordance with one embodiment of the present disclosure.
Figure 14:
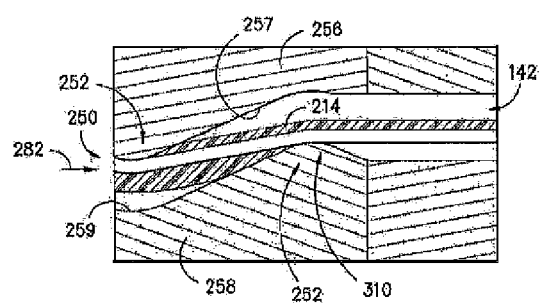
FIG. 14 is a close-up cross-sectional view of a downstream end portion of an impregnation zone in accordance with one embodiment of the present disclosure.

In some embodiments, as shown in FIGS. 10, 13 and 14, the impregnation zone 250 is defined between two spaced apart opposing impregnation plates 256 and 258, which may be included in the impregnation section. First plate 256 defines a first inner surface 257, while second plate 258 defines a second inner surface 259. The impregnation zone 250 is defined between the first plate 256 and the second plate 258. The contact surfaces 252 may be defined on or extend from both the first and second inner surfaces 257 and 259, or only one of the first and second inner surfaces 257 and 259.

In exemplary embodiments, as shown in FIGS. 10, 13 and 14, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

Angle 254 at which the rovings 142 traverse the contact surfaces 252 may be generally high enough to enhance shear and pressure, but not so high to cause excessive forces that will break the fibers. Thus, for example, the angle 254 may be in the range between approximately 1° and approximately 30°, and in some embodiments, between approximately 5° and approximately 25°.

Figure 12:
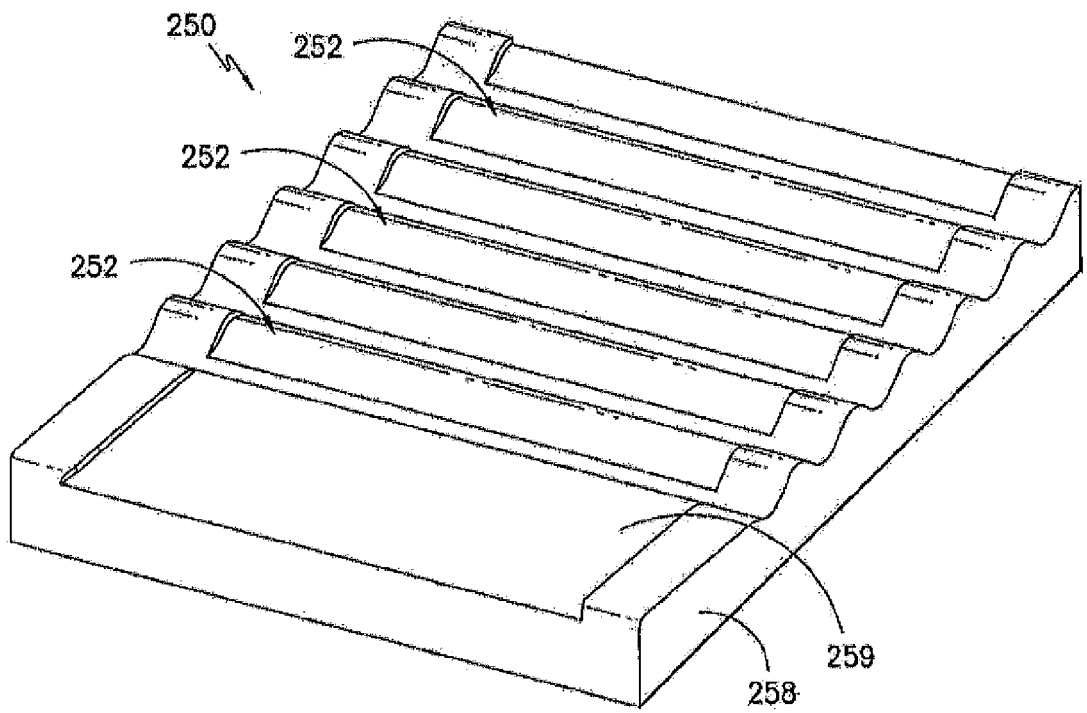
FIG. 12 is a perspective view of one embodiment of a second impregnation plate at least partially defining an impregnation zone in accordance with one embodiment of the present disclosure.

As stated above, contact surfaces 252 typically possess a curvilinear surface, such as a curved lobe, pin, etc. In exemplary embodiments as shown, a plurality of peaks, which may form contact surfaces 252, and valleys are thus defined. Further, in many exemplary embodiments, the impregnation zone 250 has a waveform cross-sectional profile. In one exemplary embodiment as shown in FIGS. 10 and 12 through 14, the contact surfaces 252 are lobes that form portions of the waveform surfaces of both the first and second plates 256 and 258 and define the waveform cross-sectional profile. FIG. 12 illustrates the second plate 258 and the various contact surfaces thereon that form at least a portion of the impregnation zone 250 according to some of these embodiments.

In other embodiments, the contact surfaces 252 are lobes that form portions of a waveform surface of only one of the first or second plate 256 or 258. In these embodiments, impingement occurs only on the contact surfaces 252 on the surface of the one plate. The other plate may generally be flat or otherwise shaped such that no interaction with the coated rovings occurs.

In other alternative embodiments, the impregnation zone 250 may include a plurality of pins (or rods), each pin having a contact surface 252. The pins may be static, freely rotational (not shown), or rotationally driven. Further, the pins may be mounted directly to the surface of the plates defining the impingement zone, or may be spaced from the surface. It should be noted that the pins may be heated by heaters 143, or may be heated individually or otherwise as desired or required. Further, the pins may be contained within the die 150, or may extend outwardly from the die 150 and not be fully encased therein.

In further alternative embodiments, the contact surfaces 252 and impregnation zone 250 may comprise any suitable shapes and/or structures for impregnating the rovings 142 with the resin 214 as desired or required.

As discussed, a roving 142 traversed through an impregnation zone 250 according to the present disclosure may become impregnated by resin 214, thus resulting in an impregnated roving 142, and optionally a tape 152 comprising at least one roving 142, exiting the impregnation zone 250, such as downstream of the contact surfaces 252 in the run direction 282. The impregnated rovings 142 and optional tape 152 exiting the impregnation zone 250 are thus formed from a fiber impregnated polymer material, as discussed above. At least one fiber roving 142 may be contained within a polyarylene sulfide composition resin 214, as discussed above, to form the fiber impregnated polyarylene sulfide composition and resulting tape 152 or tape 156.

As shown in FIGS. 9 and 10, in some embodiments, a faceplate 290 may adjoin or be adjacent to the impregnation zone 250. The faceplate 290 may be positioned downstream of the impregnation zone 250 and, if included, the land zone 280, in the run direction 282. The faceplate 290 may contact other components of the die 150, such as the impregnation zone 250 or land zone 280, or may be spaced therefrom. Faceplate 290 is generally configured to meter excess resin 214 from the rovings 142. Thus, apertures in the faceplate 290, through which the rovings 142 traverse, may be sized such that when the rovings 142 are traversed therethrough, the size of the apertures causes excess resin 214 to be removed from the rovings 142.

As shown in FIG. 8, in alternative embodiments, the die 150 may lack a faceplate 290. Further, in some embodiments, the formation and maintenance of a tape 152 within and exited from a die 150 of the present disclosure may be facilitated through the lack of or removal of a faceplate from the die 150. Removal of the faceplate 290 allows for a plurality of rovings 142 exiting a die 150 to exit as a single sheet or tape 152, rather than as separated rovings 142 due to metering through the faceplate. This could potentially eliminate the need to later form these rovings 142 into such a sheet or tape 156. Removal of the faceplate 290 may have additional advantages. For example, removal may prevent clogging of the faceplate with resin 214, which can disrupt the traversal of rovings 142 therethrough. Additionally, removal may allow for easier access to the impregnation zone 250, and may thus make it easier to introduce and reintroduce rovings 142 to the impregnation zone 250 during start-up, after temporary disruptions such as due to breakage of a roving 142, or during any other suitable time period.

Figure 18:
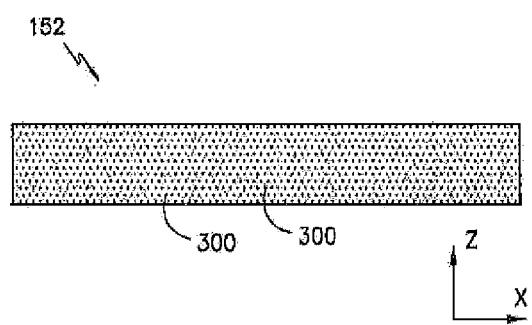
FIG. 18 is a cross-sectional view a tape in accordance with one embodiment of the present disclosure.

It should be understood that a tape 152, 156 may have any suitable cross-sectional shape and/or size. For example, such tape 152, 156 may have a generally rectangular shape as shown in FIG. 18, or a generally oval or circular or other suitable polygonal or otherwise shape. Further, it should be understood that one or more impregnated rovings 142 having been traversed through the impregnation zone 250 may together form the tape 152, 156, with the resin 214 of the various rovings 142 connected to form such tape 152, 156. The various above amounts, ranges, and/or ratios may thus in exemplary embodiments be determined for a tape 152 having any suitable number of impregnated rovings 142 embedded and generally dispersed within resin 214.

To further facilitate impregnation of the rovings 142, they may also be kept under tension while present within the die 150, and specifically within the impregnation zone 250. The tension may, for example, range from about 5 to about 300 Newtons, in some embodiments from about 50 to about 250 Newtons, and in some embodiments, from about 100 to about 200 Newtons per roving 142 or tow of fibers.

Figure 15:
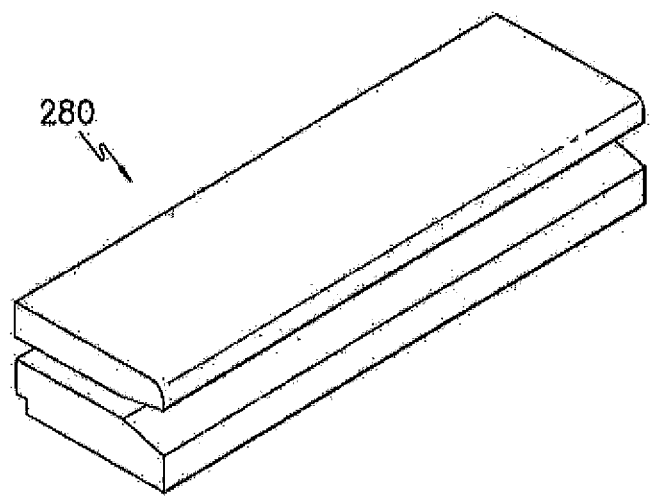
FIG. 15 is a perspective view of a land zone in accordance with one embodiment of the present disclosure.
Figure 16:
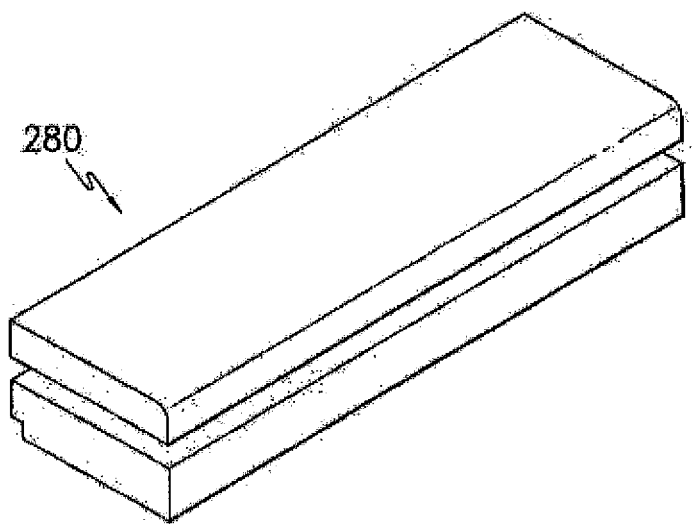
FIG. 16 is a perspective view of a land zone in accordance with one embodiment of the present disclosure.

As shown in FIGS. 15 and 16, in some embodiments, a land zone 280 may be positioned downstream of the impregnation zone 250 in run direction 282 of the rovings 142. The rovings 142 may traverse through the land zone 280 before exiting the die 150. In some embodiments, as shown in FIG. 15, at least a portion of the land zone 280 may have an increasing cross-sectional profile in run direction 282, such that the area of the land zone 280 increases. The increasing portion may be the downstream portion of the land zone 280 to facilitate the rovings 142 exiting the die 150. Alternatively, the cross-sectional profile or any portion thereof may decrease, or may remain constant as shown in FIG. 16.

Additionally, other components may be optionally employed to assist in the impregnation of the fibers. For example, a "gas jet" assembly may be employed in certain embodiments to help uniformly spread a roving of individual fibers, which may each contain up to as many as 24,000 fibers, across the entire width of the merged tow. This helps achieve uniform distribution of strength properties. Such an assembly may include a supply of compressed air or another gas that impinges in a generally perpendicular fashion on the moving rovings that pass across exit ports. The spread rovings may then be introduced into a die for impregnation, such as described above.

It should be understood that tapes 152, 156 and impregnated rovings 142 thereof according to the present disclosure need not be formed in the dies 150 and other apparatus as discussed above. Such dies 150 and apparatus are merely disclosed as examples of suitable equipment for forming tapes 152, 156. The use of any suitable equipment or process to form tapes 152, 156 is within the scope and spirit of the present disclosure.

The tapes 152 that result from use of the die and method may have a very low void fraction, which helps enhance their strength. For instance, the void fraction may be about 3% or less, in some embodiments about 2% or less, in some embodiments about 1.5% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the polymer matrix, which may then be used to calculate the "void fraction" based on the following equations:

$$V_f = 100 * (\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the polymer matrix (e.g., at the appropriate crystallinity);

$\rho_f$ is the density of the fibers;

$W_f$ is the weight fraction of the fibers; and $W_m$ is the weight fraction of the polymer matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the polymer, fibers, and tape in accordance with ASTM D 2734-09 (Method A), where the densities may be determined ASTM D792-08 Method A. Of course, the void fraction can also be estimated using conventional microscopy equipment.

Figure 17:
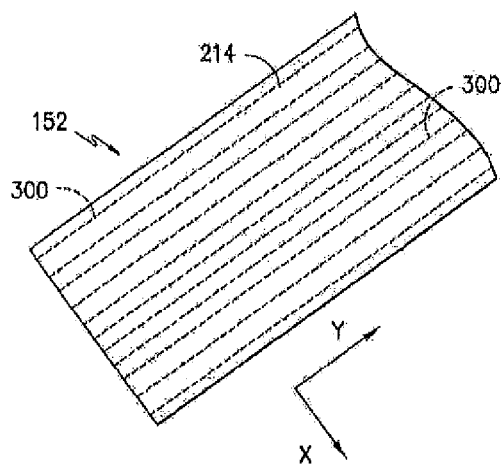
FIG. 17 is a perspective view of a tape in accordance with one embodiment of the present disclosure.

As discussed above, after exiting an impregnation die 150, the impregnated rovings 142 may in some embodiments form a tape 152. The tape 152 may be consolidated into a consolidated tape 156. The number of rovings employed in each tape 152, 156 may vary. Typically, however, a tape 152, 156 will contain from 2 to 80 rovings, and in some embodiments from 10 to 60 rovings, and in some embodiments, from 20 to 50 rovings. In some embodiments, it may be desired that the rovings are spaced apart approximately the same distance from each other within the tape 152, 156. In other embodiments, however, it may be desired that the rovings are combined, such that the fibers of the rovings are generally evenly distributed throughout the tape 152, 156, such as throughout one or more resin rich portions and a fiber rich portion as discussed above. In these embodiments, the rovings may be generally indistinguishable from each other. Referring to FIGS. 17 and 18, for example, embodiments of a tape 152 are shown that contains rovings that are combined such that the fibers are generally evenly distributed within a fiber rich portion thereof. As shown in FIG. 17, in exemplary embodiments, the fibers extend generally unidirectionally along a longitudinal axis of the tape 152.

A relatively high percentage of fibers may be employed in a tape, and fiber reinforced polyarylene sulfide composition thereof, to provide enhanced strength properties. For instance, fibers typically constitute from about 25 wt. % to about 90 wt. %, in some embodiments from about 30 wt. % to about 75 wt. %, and in some embodiments, from about 35 wt. % to about 70 wt. % of the tape or material thereof. Likewise, polymer(s) typically constitute from about 20 wt. % to about 75 wt. %, in some embodiments from about 25 wt. % to about 70 wt. %, and in some embodiments, from about 30 wt. % to about 65 wt. % of the tape 152, 156. Such percentage of fibers may additionally or alternatively by measured as a volume fraction. For example, in some embodiments, the fiber reinforced polyarylene sulfide composition may have a fiber volume fraction between approximately 25% and approximately 80%, in some embodiments between approximately 30% and approximately 70%, in some embodiments between approximately 40% and approximately 60%, and in some embodiments between approximately 45% and approximately 55%.

Thus, as discussed, in exemplary embodiments, a barrier layer 120 according to the present disclosure may be formed from a fiber reinforced polyarylene sulfide composition tape 152, 156. Referring again to FIG. 3, one embodiment of a pipe section 100 that can incorporate the polyarylene sulfide composition is illustrated. As shown, the pipe section 100 has several concentric layers. The innermost layer is the hollow body 102. The barrier layer 120 surrounds and is immediately adjacent the hollow body 102. The barrier layer 120 is formed of the polyarylene sulfide composition and provides strength and flexibility while preventing permeation of the fluid carried by the hollow body 102 through the wall thereof. In addition, the barrier layer 120 formed of the polyarylene sulfide composition can resist degradation by both the fluid carried by the hollow body 102 (e.g., the production fluid, the injection fluid, etc.) as well as by temperature conditions under which the pipe is utilized.

The pipe section 100 may also include a number of other various layers, each of which may be bonded to neighboring layers or left unbonded. For example, the pipe section 100 may also include an outer layer 822 that provides an external sleeve and an external fluid barrier as well as providing protection to the pipe section 100 from external damage due to, e.g., abrasion or encounters with environmental materials. The outer layer 822 can be formed of a polymeric material such as the polyarylene sulfide composition or a high density polyethylene that can resist both mechanical damage and intrusion of seawater to the inner layers of the pipe section 100. According to one embodiment, the outer layer 822 can be a composite material that includes a polymeric material in conjunction with a reinforcement material such as carbon fibers, carbon steel fibers, or glass fibers.

A hoop strength layer 804 can be located external to the barrier layer to increase the ability of the pipe to withstand hoop stresses caused by forced applied to the pipe wall by a pressure differential. The hoop strength layer can generally be a metal layer formed of, e.g., a helically wound strip of carbon steel that can form a layer of from about 3 to about 7 millimeters in thickness. The hoop strength layer can resist both internal pressure and bending of the pipe. In one embodiment, the carbon steel strip that forms the hoop strength layer 804 can define an interlocking profile, for instance an S- or Z-cross-sectional configuration, such that adjacent windings interlock with one another to form a stronger layer. In one embodiment, the hoop strength layer can include multiple materials for added strength. For example, in an embodiment in which design and pressure requirements call for higher burst strengths, a second flat metal strip can be helically wound over the interlocked metal strips of the hoop strength layer to provide additional strength for this layer. An intervening polymeric layer such as an anti-wear layer discussed further herein can optionally be located between the two layers of the hoop strength layer as well.

Additional strength layers 818 and 820 can be formed of helically-wound metal (generally carbon steel) strips. The strength layers 818 and 820 can be separated from the hoop strength layer 804 and from each other by polymeric anti-wear layers 817 and 819. The strength layers 818 and 820 can provide additional hoop strength as well as axial strength to the pipe. Though the pipe section 100 includes two strength layers 818, 820, it should be understood that a pipe section may include any suitable number of strength layers, including no strength layers, one, two, three, or more strength layers. In general, the helically wound metal strips of strength layers 818 and 820 will overlap but need not interlock. As such, the strength layers 818, 820 may have a width of from about 1 millimeter to about 5 millimeters.

The intervening anti-wear layers 817, 819 can be formed of the polyarylene sulfide composition or alternatively can be formed of other polymers such as a polyamide, a high density polyethylene, or the like. In one embodiment, the anti-wear layers 817, 819 can be a composite material that includes unidirectional fibers, for instance carbon or glass fibers. For instance, the anti-wear layers 817, 819 can be formed of a polymer tape or fiber-reinforced polymer tape such as a pultruded polymer tape or ribbon that is helically wound over each strength layer. The anti-wear layers 817, 819 can prevent wear of the adjacent strength layers that can come about due to motion of the layers. The anti-wear layers 817, 819 can also prevent birdcaging of the adjacent layers. As with the strength layers 818, 820 of the pipe section 100, the number of anti-wear layers is not particularly limited, and a pipe section can include no anti-wear layers, one anti-wear layers, or multiple anti-wear layers depending upon the depth and local environment in which the pipe section will be utilized, the fluid to be carried by the hollow body 102, and so forth. The anti-wear layers 817, 819, can be relatively thin, for instance between about 0.2 and about 1.5 millimeters.

A pipe section 100 may include additional layers as are generally known in the art. For example, a pipe section 100 may include an insulation layer, for instance immediately internal to the outer layer 822. An insulation layer, when present can be formed of a foam, fibrous mat, or any other insulation material as is known. By way of example, single or multiple layers of an insulation tape can be wound onto the outer strength layer to form an insulation layer between the outer strength layer 820 and the outer layer 822.

It should be understood that the various layers surrounding the barrier layer 120 as shown in FIG. 3 may similarly be utilized in any suitable bonded or unbonded pipe sections 100, such as those shown in FIG. 4 through 6.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Injection Molding Process: Tensile bars are injection molded to ISO 527-1 specifications according to standard ISO conditions.

Melt Viscosity: All materials are dried for 1.5 hours at 150° C. under vacuum prior to testing. The melt viscosity is measured on a capillary rheometer at 316° C. and 400 sec$^{-1}$ with the viscosity measurement taken after five minutes of constant shear.

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Flexural Properties: Flexural properties including flexural strength and flexural modulus are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., −30° F., or −40° F. as reported below.

Unnotched Charpy Impact Strength: Unnotched Charpy properties are tested according to ISO Test No. 180 (technically equivalent to ASTM D256). The test is run using a Type 1 specimen (length of 80 mm, width of 10 mm and thickness of 4 mm). Specimens are cut from the center of a multi-purpose bare using a single tooth milling machine. The testing temperature is 23° C.

Izod Notched Impact Strength: Notched Izod properties are tested according to ISO Test No. 180 (technically equivalent to ASTM D256, Method A). This test is run using a Type A notch. Specimens are cut from the center of a multi-purpose bar using a single tooth milling machine. The testing temperature is 23° C.

Density and Specific Gravity: Density was determined according to ISO Test No. 1183 (technically equivalent to ASTM D792). The specimen was weighed in air then weighed when immersed in distilled water at 23° C. using a sinker and wire to hold the specimen completely submerged as required.

Vicat Softening Temperature: Vicat Softening temperature was determined according to method A, with a load of 10 N and according to method B with a load of 50 N as described in ISO Test No. 306 (technically equivalent to ASTM D1525), both of which utilized a heating rate of 50 K/h.

Water absorption was determined according to ISO Test No. 62. The test specimens are immersed in distilled water at 23° C. until the water absorption essentially ceases (23° C./sat).

Complex Viscosity: Complex viscosity is determined by a Low shear sweep (ARES) utilizing an ARES-G2 (TA Instruments) testing machine equipped with 25 mm SS parallel plates and using TRIOS software. A dynamic strain sweep was performed on a pellet sample prior to the frequency sweep, in order to find LVE regime and optimized testing condition. The strain sweep was done from 0.1% to 100%, at a frequency 6.28 rad/s. The dynamic frequency sweep for each sample was obtained from 500 to 0.1 rad/s, with strain amplitude of 3%. The gap distance was kept at 1.5 mm for pellet samples. The temperature was set at 310° C. for all samples.

Figure 19:
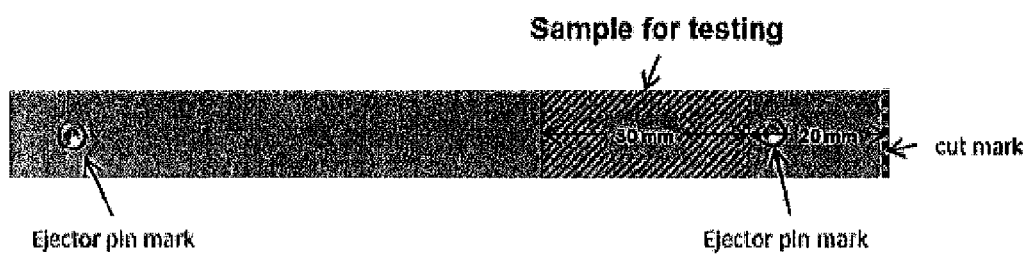
FIG. 19 illustrates the sample used in determination of melt strength and melt elongation of polyarylene sulfide compositions described herein.

Melt strength and melt elongation is performed on ARES-G2 equipped EVF fixture. The flame bar sample was cut as shown in FIG. 19. The same area of flame bar was used for each run, in order to keep the crystallinity of test sample same and thus to minimize the variation between replicates. A transient strain was applied to each sample at 0.2/s rate. At least triplicate run was done for each sample to obtain a representative curve.

Permeation Resistance: The fuel permeation studies were performed on samples according to SAE Testing Method No. J2665. For all samples, stainless-steel cups were used. Injection molded plaques with a diameter of 3 inches (7.6 centimeters) were utilized as test samples. The thickness of each sample was measured in 6 different areas. An O-ring Viton® fluoroelastomer was used as a lower gasket between cup flange and sample (Purchased from McMaster-Carr, cat#9464K57, A75). A flat Viton® fluoroelastomer (Purchased from McMaster-Carr, cat#86075K52, 1/16" thickness, A 75) was die-cut to 3 inch (7.6 cm) OD and 2.5 inch (6.35 cm) ID, and used as the upper gasket between the sample and the metal screen. The fuel, about 200 ml, was poured into the cup, the cup apparatus was assembled, and the lid was finger-tightened. This was incubated in a 40° C. oven for 1 hour, until the vapor pressure equilibrated and the lid was tightened to a torque 15 in-lb. The fuel loss was monitored gravimetrically, daily for the first 2 weeks followed by twice a week for the rest of the testing period. A blank run was done in the same manner with an aluminum disk (7.6 cm diameter, 1.5 mm thickness) and the result was subtracted from the samples. All samples were measured in duplicate. The normalized permeation rate was calculated following an equilibration period. The permeation rate for each sample was obtained from the slope of linear regression fitting of daily weight loss (gm/day). The normalized permeation rate was calculated by dividing the permeation rate by the effective permeation area and multiplying by average thickness of specimen. The average permeation rates are reported.

Salt Resistance: zinc chloride resistance was tested by use of tensile bar samples immersed in a 50% aqueous solution (by weight) of zinc chloride for 200 h at 23±2° C. Charpy notched impact test was then carried out at −30° C. calcium chloride resistance was tested by use of tensile bar samples immersed in a 50% aqueous solution (by weight) of calcium chloride for 200 h at 60±2° C. and 200 h out of solution at 60±2° C. Charpy notched impact test was then carried out at −30° C.

Hydrocarbon Volume Uptake: Absorption and diffusion testing was performed using the tab ends cut from supplied tensile bars. Each material was immersed in Brent crude oil, hydrocarbon/water mixture (and in a one-off test to hydrocarbon only). Rates and amounts of liquid absorbed were measured. The hydrocarbon liquid mixture had the following composition:

| Volume percent (%) | Composition |
|---|---|
| 10 | Distilled water |
| 60 | 70% heptane, 20% cyclohexane and 10% Toluene |
| balance | Nitrogen |

All exposure testing was conducted at 130° C. for a period of two weeks utilizing an air-circulating oven, air having been removed from the test vessel by purging with nitrogen; the test being conducted at vapor pressure.

EXAMPLE 1

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid
Disulfide: 2,2-dithiodibenzoic acid
Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the disulfide was fed using a gravimetric feeder at barrel 6. Materials were further mixed then extruded through a strand die. The strands were water-quenched in a bath to solidify and granulated in a pelletizer.

Compositions of the samples are provided in Table 1, below. Amounts are provided as weight percentages based upon the weight of the sample.

TABLE 1

| Component | Addition Point | Sample 1 | Sample 2 |
|---|---|---|---|
| Lubricant | main feed | 0.3 | 0.3 |
| Disulfide | barrel 6 |  | 1.0 |
| Impact Modifier | main feed | 25.0 | 25.0 |
| Polyarylene Sulfide | main feed | 74.7 | 73.7 |
| Total |  | 100.0 | 100.0 |

Following formation, samples were tested for a variety of physical characteristics. Results are provided in Table 2, below.

TABLE 2

|  | Sample 1 | Sample 2 |
|---|---|---|
| Melt Viscosity (poise) | 3328 | 4119 |
| Tensile Modulus (MPa) | 1826 | 1691 |
| Tensile Break Stress (MPa) | 43.73 | 44.98 |
| Tensile Break Strain (%) | 96.37 | 135.12 |
| Std. Dev. | 39.07 | 34.40 |
| Notched Charpy Impact Strength at 23° C. (kJ/m$^2$) | 61.03 | 53.00 |

Samples were annealed at 230° C. for 2 hours and re-tested for physical characteristics. Results are provided in Table 3, below.

TABLE 3

|  | Sample 1 | Sample 2 |
|---|---|---|
| Tensile Modulus (MPa) | 1994.00 | 1725.00 |
| Tensile Break Stress (MPa) | 45.04 | 45.20 |
| Tensile Break Strain (%) | 58.01 | 73.76 |
| Std. Dev. | 6.60 | 4.78 |

As can be seen, Sample 2 exhibited better tensile elongation and lower modulus before and after annealing. However, no improvement in impact strength was seen, which is believed to be due to a chain scission reaction between the disulfide and the polypropylene sulfide.

EXAMPLE 2

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. The disulfide was fed using a gravimetric feeder at various locations in the extruder; at the main feed throat, at barrel 4 and barrel 6. The crosslinking agent was fed at barrel 6. Materials were further mixed then extruded through a strand die. The strands were water-quenched in a bath to solidify and granulated in a pelletizer.

Comparative Samples 3 and 4 were formed of the same composition and compounded by use of a different screw design.

TABLE 4

|  | Addition Point | 3 | 4 | 5 | 6 | 7 | 8 | 9 | 10 |
|---|---|---|---|---|---|---|---|---|---|
| Lubricant | main feed | 0.3 | 0.3 | 0.3 | 0.3 | 0.3 | 0.3 | 0.3 | 0.3 |
| Crosslinking Agent | barrel 6 | — | — | 0.5 | 1.0 | 1.0 | 0.5 | 0.5 | 0.5 |
| Disulfide | main feed | — | — | — | — | — | 0.30 | — | — |
| Disulfide | barrel 4 | — | — | — | — | — | — | 0.3 | — |
| Disulfide | barrel 6 | — | — | — | — | — | — | — | 0.3 |
| Impact Modifier | main feed | 15.0 | 15.0 | 15.0 | 15.0 | 10.0 | 15.0 | 15.0 | 15.0 |
| Polyarylene Sulfide | main feed | 84.7 | 84.7 | 84.2 | 83.7 | 88.7 | 83.9 | 83.9 | 83.9 |
| Total |  | 100.0 | 100.0 | 100.0 | 100.0 | 100.0 | 100.0 | 100.0 | 100.0 |

Following formation, tensile bars were formed and tested for a variety of physical characteristics. Results are provided in Table 5, below.

TABLE 5

|  | Sample 3 | Sample 4 | Sample 5 | Sample 6 | Sample 7 | Sample 8 | Sample 9 | Sample 10 |
|---|---|---|---|---|---|---|---|---|
| Melt Viscosity (poise) | 2423 | — | 2659 | 2749 | 2067 | 2349 | 2310 | 2763 |
| Density (g/cm$^3$) | — | 1.28 | — | 1.25 | — | — | — | — |
| Tensile Modulus (MPa) | 2076 | 2800 | 2177 | 2207 | 2551 | 1845 | 2185 | 2309 |
| Tensile Break Stress (MPa) | 46.13 | — | 45.40 | 48.27 | 51.71 | 46.47 | 47.16 | 47.65 |
| Tensile Break Strain (%) | 33.68 | 25 | 43.97 | 35.94 | 26.90 | 47.51 | 40.85 | 63.85 |
| Elongation at Yield (%) | 5.17 | 5 | 5.59 | 7.49 | 4.5 | 11.78 | 6.94 | 7.00 |
| Yield Stress (MPa) | 51.07 | 52 | 50.76 | 51.62 | 59.63 | 51.07 | 52.56 | 51.88 |
| Notched Charpy Impact Strength at 23° C. (kJ/m$^2$) | 22.30 | 30 | 23.90 | 39.40 | 14.80 | 12.50 | 19.70 | 39.90 |
| Notched Charpy Impact Strength at −30° C. (kJ/m$^2$) | 7.8 | 7 | — | 10 | — | — | — | 10.8 |
| DTUL (° C.) | — | 100 | — | 102 | — | — | — | — |
| Melt Temp. (° C.) | 280 | 280 | 280 | 280 | 280 | 280 | 280 | 280 |
| Water absorption (%) | — | 0.05 | — | 0.05 | — | — | — | — |
| Hydrocarbon volume uptake (%) | 16 | — | — | — | — | — | — | — |

Samples were annealed at 230° C. for 2 hours and re-tested for physical characteristics. Results are provided in Table 6, below.

TABLE 6

| | Sample 3 | Sample 4 | Sample 5 | Sample 6 | Sample 7 | Sample 8 | Sample 9 | Sample 10 |
|---|---|---|---|---|---|---|---|---|
| Tensile Modulus (MPa) | 2383 | — | 2339 | 2279 | 2708 | 2326 | 2382 | 2491 |
| Tensile Break Stress (MPa) | 52.70 | — | 53.96 | 53.11 | 61.10 | 56.74 | 54.81 | 55.25 |
| Tensile Break Strain (%) | 29.42 | — | 20.97 | 35.76 | 20.34 | 31.37 | 41.23 | 49.03 |
| Std. Dev. | 6.84 | — | 6.95 | 6.66 | 5.40 | 2.83 | 2.65 | 3.74 |

As can be seen, the highest tensile elongation and highest impact strength were observed for Sample 10, which includes both the crosslinking agent and the disulfide added at the same point downstream during processing.

FIG. 20 illustrates the relationship of notched Charpy impact strength over temperature change for Sample 3 and for Sample 6. As can be seen, the polyarylene sulfide composition of Sample 6 exhibits excellent characteristics over the entire course of the temperature change, with a higher rate of increase in impact strength with temperature change as compared to the comparison material.

FIG. 21 is a scanning electron microscopy image of the polyarylene sulfide used in forming the sample 3 composition (FIG. 21A) and the Sample 6 composition (FIG. 21B). As can be seen, there is no clear boundary between the polyarylene sulfide and the impact modifier in the composition of FIG. 21B.

Tensile bar test specimens of samples 3, 6, and 10 were immersed in 10 wt. % sulfuric acid for 500 hours at either 40° C. or 80° C. Tensile properties and impact properties were measured before and after the acid exposure. Results are summarized in Table 7 below.

TABLE 7

| | Sample 3 | Sample 6 | Sample 10 |
|---|---|---|---|
| Initial properties | | | |
| Tensile Modulus (MPa) | 2076 | 2207 | 2309 |
| Tensile Break Stress (MPa) | 46.13 | 48.27 | 47.65 |
| Tensile Break Strain (%) | 33.68 | 35.94 | 63.85 |
| Charpy notched impact strength at 23° C. (kJ/m$^2$) | 22.30 | 39.40 | 39.90 |
| Properties after 500 hours exposure in sulfuric acid at 40° C. | | | |
| Tensile Modulus (MPa) | 2368 | 2318 | 2327 |
| Tensile Break Stress (MPa) | 48.83 | 48.48 | 48.53 |
| Tensile Break Strain (%) | 10.99 | 28.28 | 30.05 |
| Charpy notched impact strength at 23° C. (kJ/m$^2$) | 18.4 | 33.6 | 35.9 |
| Loss in Charpy notched impact strength (%) | 18 | 15 | 15 |
| Properties after 500 hour exposure in sulfuric acid at 80° C. | | | |
| Tensile Modulus (MPa) | 2341 | 2356 | 2354 |
| Tensile Break Stress (MPa) | 49.61 | 48.04 | 48.86 |
| Tensile Break Strain (%) | 10.60 | 19.88 | 26.32 |
| Charpy notched impact strength at 23° C. (kJ/m$^2$) | 9.2 | 31.0 | 34.0 |
| Loss in Charpy notched impact strength (%) | 59 | 21 | 15 |

Figure 22:
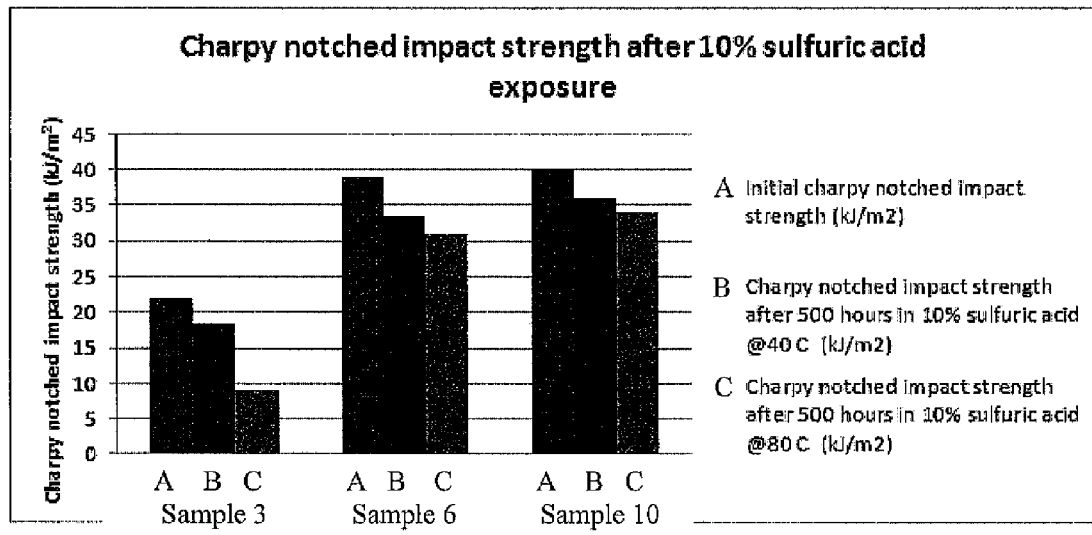
FIG. 22 compares the effect of sulfuric acid exposure on strength characteristics of polyarylene sulfide compositions as described herein and a comparison composition.

The results in the change in Charpy notched impact strength over time during exposure to the acid solution at an elevated temperature are illustrated in FIG. 22. As can be seen, the relative loss of strength of samples 6 and 10 is much less than the comparison sample.

EXAMPLE 3

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at the main feed throat and at barrel 6. Materials were further mixed then extruded through a strand die. The strands were water-quenched in a bath to solidify and granulated in a pelletizer.

Compositions of the samples are provided in Table 8, below. Amounts are provided as weight percentages based upon the weight of the sample.

TABLE 8

| Component | Addition Point | Sample 11 | Sample 12 | Sample 13 | Sample 14 |
|---|---|---|---|---|---|
| Lubricant | main feed | 0.3 | 0.3 | 0.3 | 0.3 |
| Crosslinking Agent | main feed | — | 0.5 | 1.0 | — |
| Crosslinking Agent | barrel 6 | — | — | — | 1.0 |
| Impact Modifier | main feed | 15.0 | 15.0 | 15.0 | 15.0 |
| Polyarylene Sulfide | main feed | 84.7 | 84.2 | 83.7 | 83.7 |
| Total | | 100.0 | 100.0 | 100.0 | 100.0 |

Following formation, tensile bars formed of the samples were tested for a variety of physical characteristics. Results are provided in Table 9, below.

TABLE 9

| | Sample 11 | Sample 12 | Sample 13 | Sample 14 |
|---|---|---|---|---|
| Melt Viscosity (poise) | 2649 | 2479 | 2258 | 3778 |
| Tensile Modulus (MPa) | 2387 | 2139 | 2150 | 1611 |
| Tensile Break Stress (MPa) | 46.33 | 49.28 | 51.81 | 42.44 |

TABLE 9-continued

|  | Sample 11 | Sample 12 | Sample 13 | Sample 14 |
|---|---|---|---|---|
| Tensile Break Strain (%) | 24.62 | 22.60 | 14.45 | 53.62 |
| Std. Dev. | 9.19 | 1.51 | 2.23 | 1.90 |
| Notched Charpy Impact Strength at 23° C. (kJ/m$^2$) | 27.50 | 8.50 | 6.00 | 39.30 |
| Std. Dev. | 2.7 | 1.10 | 0.60 | 2.10 |

As can be seen, upstream feed of the crosslinking agent decreased the impact properties of the composition, while downstream feed increased the tensile elongation by 118% and room temperature impact strength by 43%.

EXAMPLE 4

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 10, below. Amounts are provided as weight percentages based upon the weight of the sample.

TABLE 10

| Component | Addition Point | Sample 15 | Sample 16 | Sample 17 | Sample 18 |
|---|---|---|---|---|---|
| Lubricant | main feed | 0.3 | 0.3 | 0.3 | 0.3 |
| Crosslinking Agent | barrel 6 | 1.0 | 1.7 | 1.0 | 1.7 |
| Impact Modifier | main feed | 25.0 | 25.0 | 15.0 | 15.0 |
| Polyarylene Sulfide | main feed | 73.7 | 73.0 | 83.7 | 83.0 |
| Total |  | 100.0 | 100.0 | 100.0 | 100.0 |

Following formation, tensile bars formed of the samples were tested for a variety of physical characteristics. Results are provided in Table 11, below.

TABLE 11

|  | Sample 15 | Sample 16 | Sample 17 | Sample 18 |
|---|---|---|---|---|
| Melt Viscosity (poise) | 4255 | 4198 | 2522 | 2733 |
| Density (g/cm$^3$) | 1.2 | — | — | — |
| Tensile Modulus (MPa) | 1582.00 | 1572.00 | 2183.00 | 2189.00 |
| Tensile Break Stress (MPa) | 45.59 | 46.29 | 48.98 | 49.26 |
| Tensile Break Strain (%) | 125.92 | 116.40 | 66.13 | 48.24 |
| Std. Dev. | 19.79 | 9.97 | 15.36 | 7.80 |
| Elongation at Yield (%) | 23 | — | — | — |
| Yield Stress (MPa) | 42 | — | — | — |
| Flex Modulus (MPa) | 1946.00 | 1935.00 | 2389.00 | 2408.00 |
| Flexural Stress @3.5% (MPa) | 48.30 | 48.54 | 68.55 | 68.12 |

TABLE 11-continued

|  | Sample 15 | Sample 16 | Sample 17 | Sample 18 |
|---|---|---|---|---|
| Notched Charpy Impact Strength at 23° C. (kJ/m$^2$) | 55.60 | 51.80 | 43.60 | 19.10 |
| Std. Dev. | 1.00 | 1.40 | 1.50 | 1.50 |
| Notched Charpy Impact Strength at −30° C. (kJ/m$^2$) | 13 | — | — | — |
| Notched Charpy Impact Strength at −40° C. (kJ/m$^2$) | 13.30 | 12.10 | 11.26 | 8.70 |
| Std. Dev. | 1.50 | 0.90 | 0.26 | 0.50 |
| DTUL (1.8 MPa) (° C.) | 97.20 | 97.60 | 101.70 | 100.90 |
| Water absorption (%) | 0.07 | — | — | — |

EXAMPLE 5

Materials as described in Example 1 were utilized except for the polyarylene sulfide, which was Fortron® 0320 linear polyphenylene sulfide available from Ticona Engineering Polymers of Florence, Ky. Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide and impact modifier were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 12, below. Amounts are provided as weight percentages based upon the weight of the sample.

TABLE 12

| Component | Addition Point | Sample 19 | Sample 20 | Sample 21 | Sample 22 | Sample 23 |
|---|---|---|---|---|---|---|
| Crosslinking Agent | barrel 6 | — | — | — | 0.1 | 0.2 |
| Impact Modifier | main feed | — | 1.5 | 3.0 | 1.5 | 3.0 |
| Polyarylene Sulfide | main feed | 100.0 | 98.5 | 97.0 | 98.4 | 96.8 |
| Total |  | 100.0 | 100.0 | 100.0 | 100.0 | 100.0 |

Following formation, tensile bars formed of the samples were tested for a variety of physical characteristics. Results are provided in Table 13, below.

TABLE 13

|  | Sample 19 | Sample 20 | Sample 21 | Sample 22 | Sample 23 |
|---|---|---|---|---|---|
| Melt Viscosity (poise) | 2435 | 2684 | 2942 | 2287 | 1986 |
| Tensile Modulus (MPa) | 3208 | 3207 | 3104 | 3245 | 3179 |
| Tensile Break Stress (MPa) | 67.20 | 72.94 | 59.06 | 63.95 | 60.80 |
| Tensile Break Strain (%) | 2.46 | 4.54 | 11.96 | 6.31 | 11.40 |
| Std. Dev. | 0.32 | 1.11 | 1.24 | 2.25 | 3.53 |
| Flex Modulus (MPa) | 3103.00 | 3173.00 | 3031.00 | 3284.00 | 3156.00 |
| Flexural Stress @3.5% (MPa) | 105.76 | 104.74 | 100.21 | 109.09 | 104.81 |

TABLE 13-continued

| | Sample 19 | Sample 20 | Sample 21 | Sample 22 | Sample 23 |
|---|---|---|---|---|---|
| Notched Izod Impact Strength at 23° C. (kJ/m$^2$) | 2.90 | 5.20 | 5.60 | 4.10 | 4.30 |
| Std. Dev. | 0.40 | 0.40 | 0.40 | 0.20 | 0.20 |
| DTUL (1.8 MPa) (° C.) | 105.60 | 104.00 | 103.70 | 104.20 | 104.80 |

EXAMPLE 6

Materials utilized to form the compositions included the following:

Polyarylene sulfide: Fortron® 0214 linear polyphenylene sulfide available from Ticona Engineering Polymers of Florence, Ky.

Impact Modifier: LOTADER® 4720—a random terpolymer of ethylene, ethyl acrylate and maleic anhydride available from Arkema, Inc.

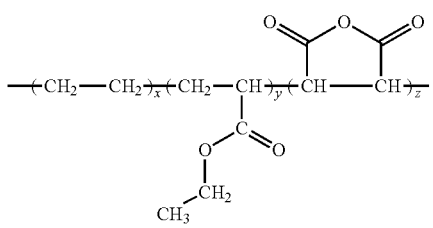

Crosslinking Agent: Hydroquinone

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at the main feed for samples 24 and 25 and at barrel 6 for samples 26 and 27. Materials were further mixed then extruded through a strand die. The strands were water-quenched in a bath to solidify and granulated in a pelletizer.

Compositions of the samples are provided in Table 14, below. Amounts are provided as weight percentages based upon the weight of the sample.

TABLE 14

| Component | Addition Point | Sample 24 | Sample 25 | Sample 26 | Sample 27 | Sample 28 |
|---|---|---|---|---|---|---|
| Lubricant | main feed | 0.3 | 0.3 | 0.3 | 0.3 | 0.3 |
| Crosslinking Agent | barrel 6 | — | — | — | 0.1 | 0.2 |
| Crosslinking Agent | main feed | — | 0.1 | 0.2 | — | — |
| Impact Modifier | main feed | 15.0 | 15.0 | 15.0 | 15.0 | 15.0 |
| Polyarylene Sulfide | main feed | 84.7 | 84.6 | 84.5 | 84.6 | 84.5 |
| Total | | 100.0 | 100.0 | 100.0 | 100.0 | 100.0 |

Following formation, samples were tested for a variety of physical characteristics. Results are provided in Table 15, below.

TABLE 15

| | Sample 24 | Sample 25 | Sample 26 | Sample 27 | Sample 28 |
|---|---|---|---|---|---|
| Melt Viscosity (poise) | 2435 | 2797 | 3251 | 2847 | 2918 |
| Tensile Modulus (MPa) | 2222 | 2164 | 2163 | 2184 | 2145 |
| Tensile Break Stress (MPa) | 52.03 | 45.17 | 46.53 | 45.47 | 46.39 |
| Tensile Break Strain (%) | 36.65 | 50.91 | 63.39 | 38.93 | 41.64 |
| Std. Dev. | 9.09 | 14.9 | 11.88 | 7.62 | 10.42 |
| Elongation at Yield (%) | 5.75 | 5.49 | 5.76 | 5.53 | 5.70 |
| Yield Stress (MPa) | 52.03 | 50.21 | 50.77 | 51.39 | 50.85 |
| Flexural Modulus (MPa) | 2358.00 | 2287.00 | 2286.00 | 2305.00 | 2281.00 |
| Flexural Stress @3.5% (MPa) | 70.51 | 68.25 | 68.03 | 69.23 | 68.23 |
| Notched Charpy Impact Strength at 23° C. (kJ/m$^2$) | 29.80 | 44.60 | 50.60 | 42.30 | 45.90 |
| Std. Dev. | 4.10 | 2.40 | 1.90 | 1.90 | 1.60 |
| Notched Charpy Impact Strength at −40° C. (kJ/m$^2$) | 5.90 | 9.30 | 11.00 | 9.60 | 9.80 |
| Std. Dev. | 1.00 | 0.90 | 1.20 | 0.80 | 1.30 |
| DTUL (1.8 MPa) (° C.) | 99.10 | 93.90 | 98.20 | 100.10 | 99.00 |

EXAMPLE 7

Materials utilized to form the compositions included the following:

Polyarylene sulfide:

PPS1—Fortron® 0203 linear polyphenylene sulfide available from Ticona Engineering Polymers of Florence, Ky.

PPS2—Fortron®0205 linear polyphenylene sulfide available from Ticona Engineering Polymers of Florence, Ky.

PPS3—Fortron®0320 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 16, below. Amounts are provided as weight percentages based upon the weight of the sample.

TABLE 16

| Component | Addition Point | Sample 29 | Sample 30 | Sample 31 | Sample 32 | Sample 33 | Sample 34 |
|---|---|---|---|---|---|---|---|
| Lubricant | main feed | 0.3 | 0.3 | 0.3 | 0.3 | 0.3 | 0.3 |
| Crosslinking Agent | barrel 6 | | 1.0 | | 1.0 | | 1.0 |
| Impact Modifier | main feed | 15.0 | 15.0 | 15.0 | 15.0 | 15.0 | 15.0 |
| PPS1 | main feed | 84.7 | 83.7 | | | | |
| PPS2 | main feed | | | 84.7 | 83.7 | | |
| PPS3 | main feed | | | | | 84.7 | 83.7 |
| Total | | 100.0 | 100.0 | 100.0 | 100.0 | 100.0 | 100.0 |

Following formation, samples were tested for a variety of physical characteristics. Results are provided in Table 17, below.

TABLE 17

| | Sample 29 | Sample 30 | Sample 31 | Sample 32 | Sample 33 | Sample 34 |
|---|---|---|---|---|---|---|
| Tensile Modulus (MPa) | 2292 | 2374 | 2250 | 2427 | 2130 | 2285 |
| Tensile Break Stress (MPa) | 50.92 | 50.18 | 49.18 | 53.22 | 48.01 | 48.08 |
| Tensile Break Strain (%) | 5.79 | 2.84 | 23.79 | 34.73 | 23.55 | 45.42 |
| Std. Dev. | 0.99 | 0.18 | 11.96 | 4.01 | 18.57 | 18.94 |
| Flexural Modulus (MPa) | 2279.00 | 2382.00 | 2257.00 | 2328.00 | 2292.00 | 2294.00 |
| Flexural Stress @3.5% (MPa) | 71.11 | 74.94 | 69.72 | 72.39 | 67.95 | 68.95 |
| Notched Charpy Impact Strength at 23° C. (kJ/m$^2$) | 5.70 | 3.70 | 9.10 | 12.80 | 19.40 | 45.40 |
| Std. Dev. | 0.90 | 0.70 | 0.80 | 1.00 | 2.70 | 7.70 |
| Notched Charpy Impact Strength at −40° C. (kJ/m$^2$) | 3.00 | 2.50 | 5.10 | 5.00 | 5.10 | 8.00 |
| Std. Dev. | 0.70 | 0.30 | 0.60 | 0.30 | 0.40 | 1.00 |
| DTUL (1.8 MPa) (° C.) | 101.00 | 105.50 | 100.00 | 102.90 | 99.90 | 100.40 |

EXAMPLE 8

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 18, below. Amounts are provided as weight percentages based upon the weight of the sample.

TABLE 18

| Component | Addition Point | Sample 35 | Sample 36 | Sample 37 | Sample 38 | Sample 39 | Sample 40 |
|---|---|---|---|---|---|---|---|
| Lubricant | main feed | 0.3 | 0.3 | 0.3 | 0.3 | 0.3 | 0.3 |
| Crosslinking Agent | barrel 6 | | 0.75 | | 1.25 | | 1.75 |
| Impact Modifier | main feed | 15.0 | 15.0 | 25.0 | 25.0 | 35.0 | 35.0 |
| Polyarylene Sulfide | main feed | 84.7 | 83.95 | 74.70 | 73.45 | 64.70 | 62.95 |
| Total | | 100.0 | 100.0 | 100.0 | 100.0 | 100.0 | 100.0 |

Following formation, samples were tested for a variety of physical characteristics. Results are provided in Table 19, below. Sample 39 was not injection moldable.

TABLE 19

| | Sample 35 | Sample 36 | Sample 37 | Sample 38 | Sample 39 | Sample 40 |
|---|---|---|---|---|---|---|
| Melt Viscosity (poise) | 2323 | 2452 | 2955 | 3821 | 2025 | 5462 |
| Tensile Modulus (MPa) | 2281 | 2298 | 2051 | 1721 | — | 1045 |
| Tensile Break Stress (MPa) | 47.09 | 49.09 | 47.29 | 46.18 | — | 39.81 |
| Tensile Break Strain (%) | 28.92 | 36.42 | 97.33 | 110.36 | — | 96.76 |
| Std. Dev. | 6.35 | 3.13 | 53.94 | 8.40 | — | 1.77 |
| Elongation at Yield (%) | 5.28 | 8.58 | 36.00 | 108.19 | — | 95.77 |
| Yield Stress (MPa) | 52.42 | 53.92 | 46.50 | 46.76 | — | 40.43 |
| Flexural Modulus (MPa) | 2388.00 | 2349.00 | 2210.00 | 1750.00 | — | 1209.00 |
| Flexural Stress @3.5% (MPa) | 71.52 | 71.70 | 63.15 | 50.52 | — | 34.41 |
| Notched Charpy Impact Strength at 23° C. (kJ/m$^2$) | 35.15 | 38.40 | 57.00 | 52.70 | — | 52.10 |
| Std. Dev. | 6.22 | 1.50 | 1.40 | 3.40 | — | 2.10 |
| Notched Charpy Impact Strength at −30° C. (kJ/m$^2$) | 8.20 | 10.70 | 8.70 | 18.10 | — | 14.10 |
| Std. Dev. | 1.50 | 1.60 | 0.20 | 0.90 | — | 0.80 |
| Notched Charpy Impact Strength at −40° C. (kJ/m$^2$) | 7.26 | 9.20 | 8.00 | 16.80 | — | 12.47 |
| Std. Dev. | 1.54 | 2.30 | 0.60 | 0.40 | — | 0.92 |
| DTUL (1.8 MPa) (° C.) | 99.90 | 103.60 | 98.10 | 99.30 | — | 92.70 |
| Water absorption (%) | — | — | — | — | — | 0.1 |

EXAMPLE 9

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 20, below. Amounts are provided as weight percentages based upon the weight of the sample.

TABLE 20

| Component | Addition Point | Sample 41 | Sample 42 | Sample 43 | Sample 44 |
|---|---|---|---|---|---|
| Lubricant | main feed | 0.3 | 0.3 | 0.3 | 0.3 |
| Crosslinking Agent | barrel 6 | 1.0 | 1.1 | 1.25 | 1.25 |
| Impact Modifier | main feed | 15 | 20 | 25 | 30 |
| Polyarylene Sulfide | main feed | 83.7 | 78.6 | 73.45 | 68.45 |
| Total | | 100.0 | 100.0 | 100.0 | 100.0 |

Following formation, samples were tested for a variety of physical characteristics. Results are provided in Table 21, below.

TABLE 21

| | Sample 41 | Sample 42 | Sample 43 | Sample 44 |
|---|---|---|---|---|
| Specific Gravity (g/cm$^3$) | 1.25 | 1.20 | 1.15 | 1.20 |
| Tensile Modulus (MPa) (50 mm/min) | 2200 | 1600 | 1200 | 1700 |
| Tensile Break Strength (MPa) (50 mm/min) | 50 | 42 | 40 | 46 |
| Elongation at Break (%) (50 mm/min) | 40 | 100 | 90 | 75 |
| Yield Stress (MPa) (50 mm/min) | 55 | 42 | 40 | 48 |
| Yield Strain (%) (50 mm/min) | 9 | 25 | 90 | 15 |
| Flexural Modulus (MPa) | 2200 | 1700 | 1300 | 1900 |
| Flexural Strength @3.5% (MPa) | 68 | 50 | 40 | 56 |
| Notched Charpy Impact Strength at 23° C. (kJ/m$^2$) | 40 | 55 | 50 | 50 |
| Notched Charpy Impact Strength at −30° C. | 10 | 24 | 20 | 20 |
| Unnotched Charpy Impact Strength at 23° C. | Not broken | Not broken | Not broken | Not broken |
| DTUL (1.8 MPa) (° C.) | 102 | 100 | 95 | 100 |
| Water absorption (%) | 0.05 | 0.07 | 0.1 | 0.05 |
| Vicat softening temp. (A10N, ° C.) | 270 | 270 | 270 | 270 |
| Vicat softening temp. (B50N, ° C.) | 200 | 160 | 110 | 180 |
| Complex viscosity (0.1 rad/sec, 310° C.) (kPa/sec) | 79.994 | 289.27 | 455.19 | — |
| Hydrocarbon volume uptake (%) | 14 | 23 | — | 19 |

Figure 23:
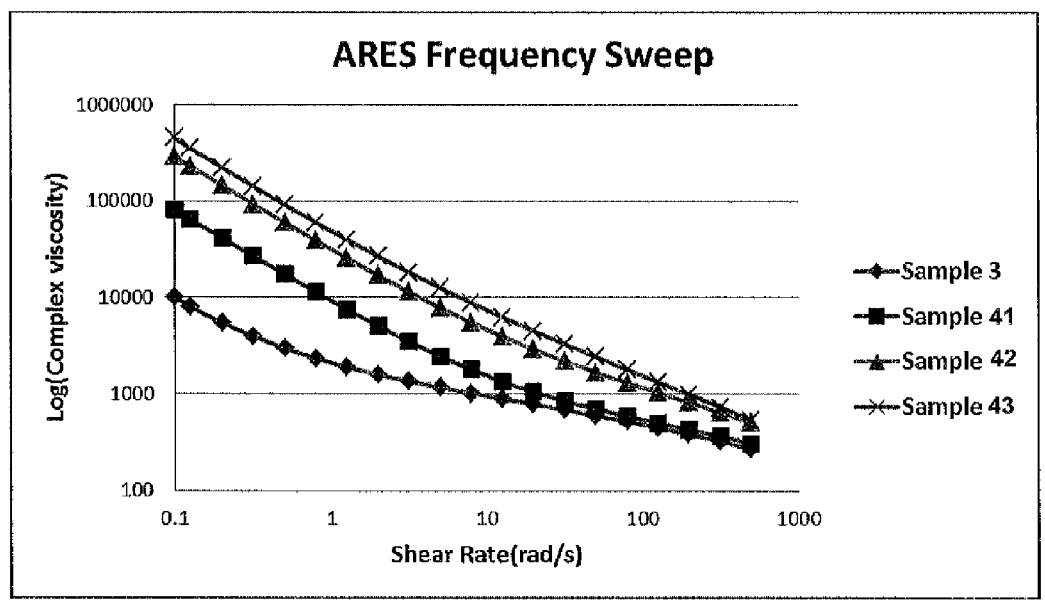
FIG. 23 provides the log of the complex viscosity obtained for polyarylene sulfide compositions described herein as a function of the shear rate.
Figure 24:
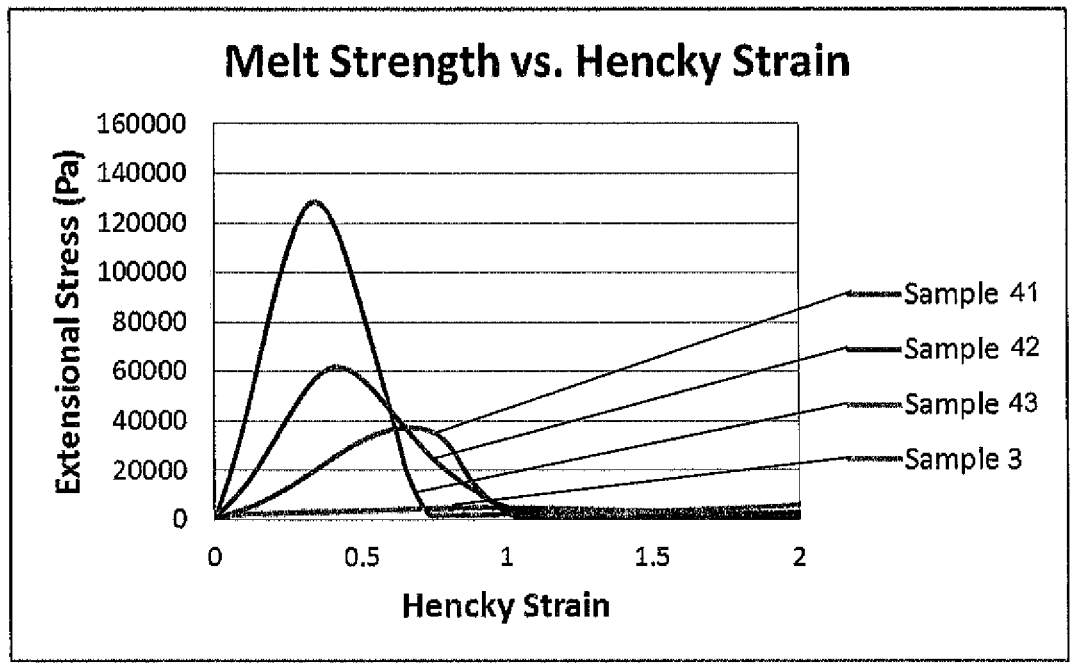
FIG. 24 provides the melt strength of polyarylene sulfide compositions described herein as a function of the Hencky strain.
Figure 25:
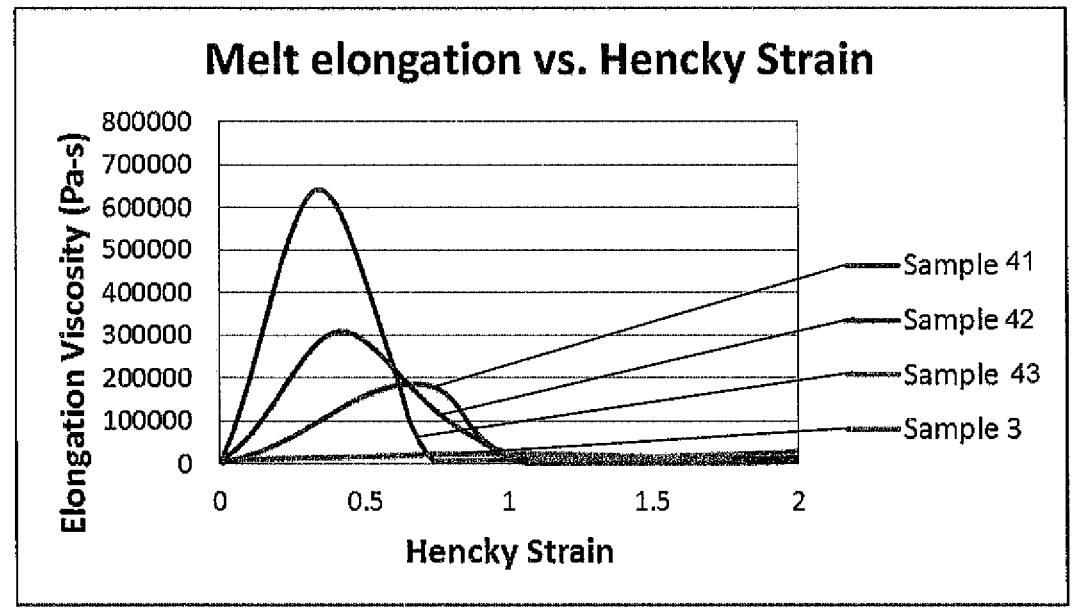
FIG. 25 provides the melt elongation for polyarylene sulfide compositions described herein as a function of Hencky strain.

Samples 41, 42, and 43 were tested to determine complex viscosity as well as melt strength and melt elongation as a function of Hencky strain. As a comparative material, Sample 3 as described in Example 2 was utilized. Samples 41, 42 and 43 were done at 310° C. and sample 3 was done at 290° C. Results are shown in FIG. 23, FIG. 24, and FIG. 25.

EXAMPLE 10

Samples 41, 42, and 43 described in Example 9 were tested to determine permeation of various fuels including CE10 (10 wt. % ethanol, 45 wt. % toluene, 45 wt. % iso-octane), CM15A (15 wt. % methanol and 85 wt. % oxygenated fuel), and methanol. Sample No. 4 described in Example 2 was utilized as a comparison material. Two samples of each material were tested.

Table 22, below provides the average sample thickness and effective area for the samples tested with each fuel.

TABLE 22

| Sample | Average Sample Thickness (mm) | Effective area (m$^2$) |
|---|---|---|
| CE10 | | |
| Aluminum blank - 1 | 1.50 | 0.00418 |
| Aluminum blank - 2 | 1.50 | 0.00418 |
| Sample No. 4-1 | 1.47 | 0.00418 |
| Sample No. 4-2 | 1.45 | 0.00418 |
| Sample No. 41-1 | 1.47 | 0.00418 |
| Sample No. 41-2 | 1.49 | 0.00418 |
| Sample No. 42-1 | 1.47 | 0.00418 |
| Sample No. 42-2 | 1.46 | 0.00418 |
| Sample No. 43-1 | 1.45 | 0.00418 |
| Sample No. 43-2 | 1.47 | 0.00418 |
| CM15A | | |
| Aluminum blank-1 | 1.50 | 0.00418 |
| Aluminum blank-2 | 1.50 | 0.00418 |
| Sample No. 4-1 | 1.48 | 0.00418 |
| Sample No. 4-2 | 1.49 | 0.00418 |
| Sample No. 41-1 | 1.49 | 0.00418 |
| Sample No. 41-2 | 1.50 | 0.00418 |
| Sample No. 42-1 | 1.47 | 0.00418 |
| Sample No. 42-2 | 1.48 | 0.00418 |
| Sample No. 43-1 | 1.46 | 0.00418 |
| Sample No. 43-2 | 1.47 | 0.00418 |
| Methanol | | |
| Aluminum blank - 1 | 1.50 | 0.00418 |
| Aluminum blank - 2 | 1.50 | 0.00418 |
| Sample No. 4-1 | 1.49 | 0.00418 |
| Sample No. 4-2 | 1.49 | 0.00418 |
| Sample No. 41-1 | 1.49 | 0.00418 |
| Sample No. 41-2 | 1.51 | 0.00418 |
| Sample No. 42-1 | 1.48 | 0.00418 |
| Sample No. 42-2 | 1.47 | 0.00418 |
| Sample No. 43-1 | 1.47 | 0.00418 |
| Sample No. 43-2 | 1.48 | 0.00418 |

Figure 26:
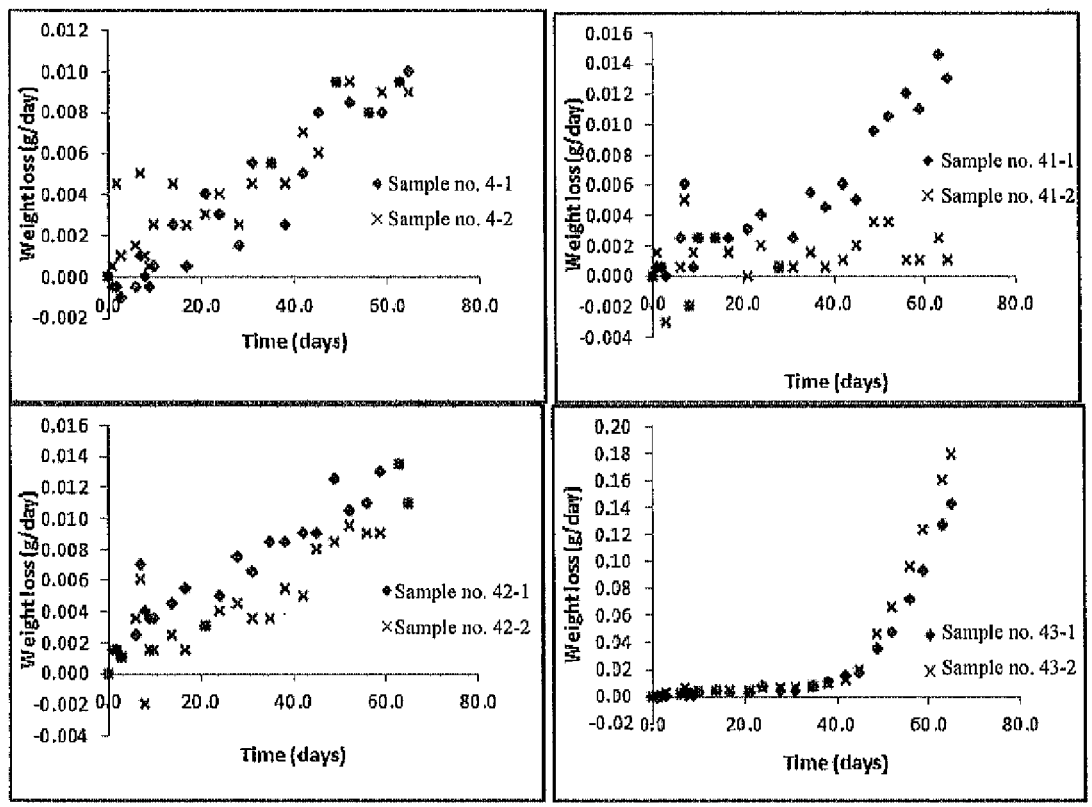
FIG. 26 illustrates the daily weight loss for testing samples in determination of permeation resistance of polyarylene sulfide compositions to CE10 fuel blend.
Figure 27:
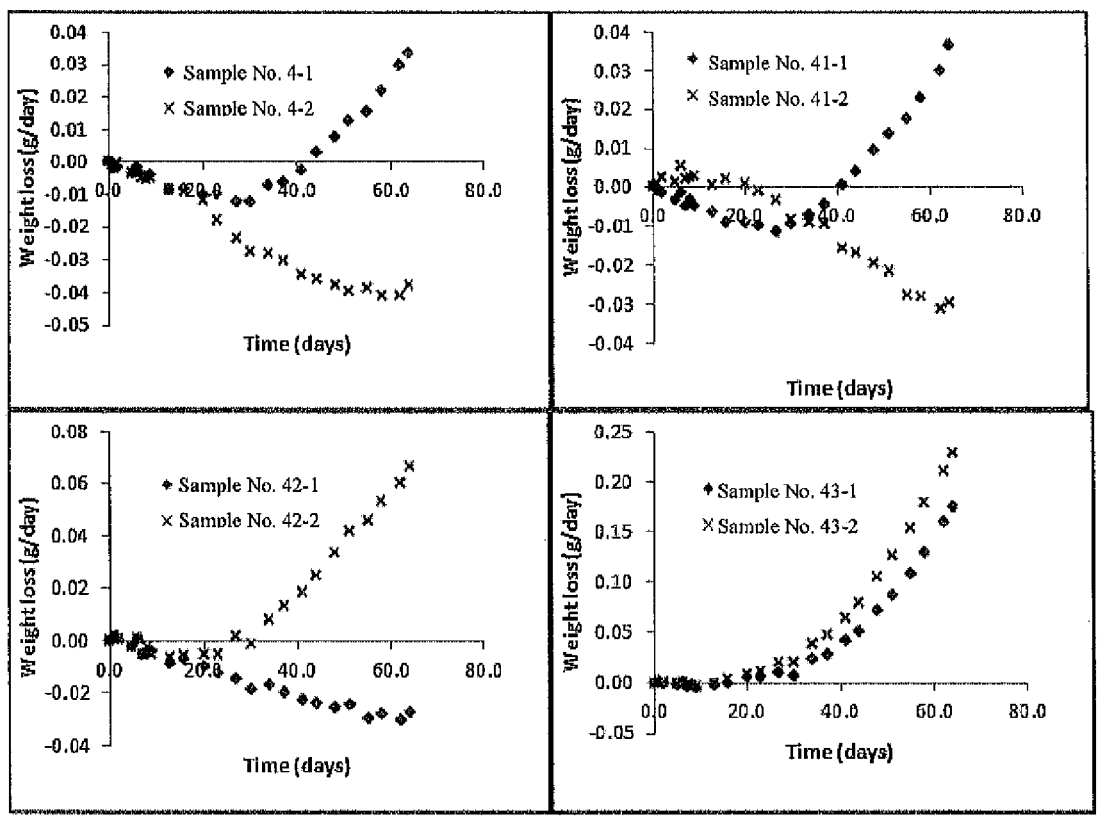
FIG. 27 illustrates the daily weight loss for testing samples in determination of permeation resistance of polyarylene sulfide compositions to CM15A fuel blend.
Figure 28:
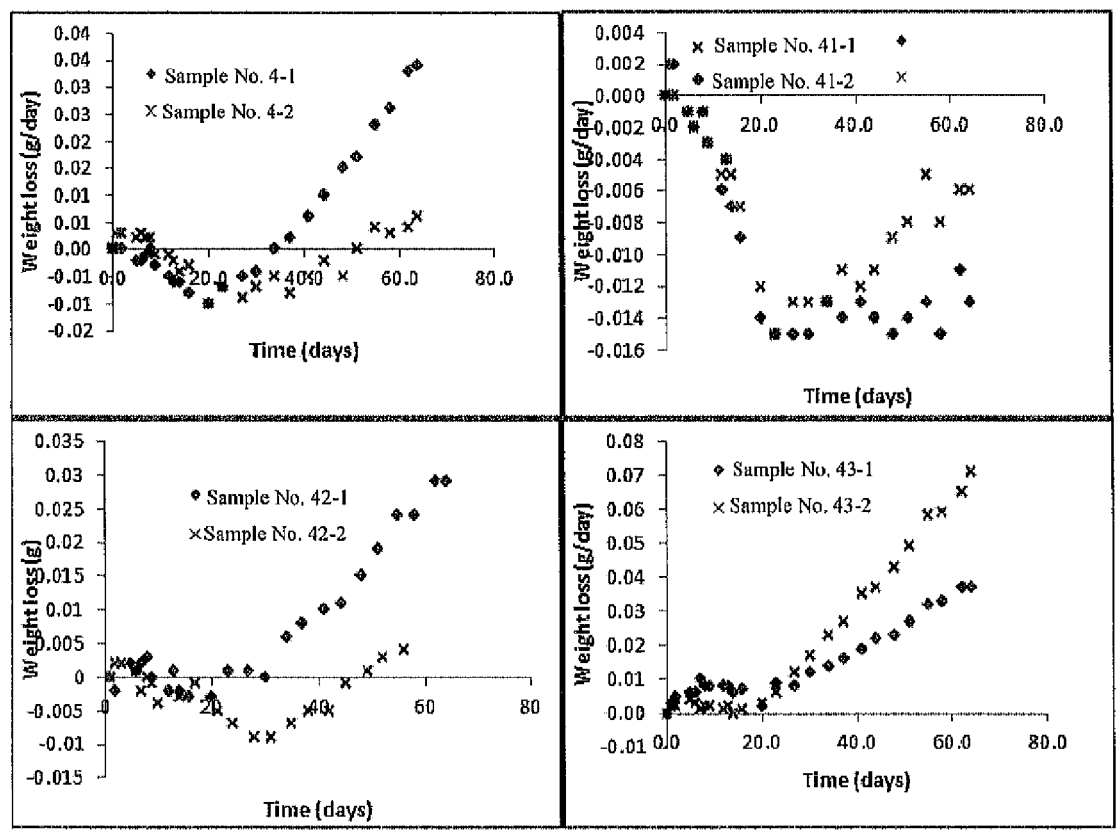
FIG. 28 illustrates the daily weight loss for testing samples in determination of permeation resistance of polyarylene sulfide compositions to methanol.

The daily weight losses for each material and each fuel are shown in FIGS. 26-28. Specifically, FIG. 26 shows the daily weight loss for the samples during the permeation test of CE10, FIG. 27 shows the daily weight loss for the samples during the permeation test of CM15A, and FIG. 28 shows the daily weight loss for the samples during the permeation test of methanol.

The average permeation rates for each sample with each fuel are provided in Table 23. Note that Sample No. 43 takes a longer time to arrive at equilibrium, so the linear regression fitting was generated based on data between days 42 and 65 for this material, while the linear regress fitting was generated for the other materials between days 32 and 65. For methanol, the linear regression fitting was generated based on data between days 20 and 65, but with Sample No. 604, the methanol linear regression fitting was generated based on data between days 30 and 65. Some samples show negative permeability, which is because the weight loss of the sample was lower than that of the aluminum blank.

TABLE 23

| Sample | Normalized permeation (g-mm/day-m$^2$) | Average Normalized permeation (g-mm/day-m$^2$) | Permeation - 3 mm thickness | Average Permeation - 3 mm thickness |
|---|---|---|---|---|
| CE10 | | | | |
| Sample No. 4-1 | 0.06 | 0.05 ± 0.01 | 0.02 | 0.02 ± 0 |
| Sample No. 4-2 | 0.05 | | 0.02 | |
| Sample No. 41-1 | 0.07 | 0.04 ± 0.04 | 0.02 | 0.01 ± 0.01 |
| Sample No. 41-2 | 0.01 | | 0.00 | |
| Sample No. 42-1 | 0.06 | 0.06 ± 0 | 0.02 | 0.02 ± 0 |
| Sample No. 42-2 | 0.06 | | 0.02 | |
| Sample No. 43-1 | 2020 | 2.51 ± 0.43 | 0.73 | 0.84 ± 0.14 |
| Sample No. 43-2 | 2.81 | | 0.94 | |
| CM15A | | | | |
| Sample No. 4-1 | 0.49 | 0.18 ± 0.44 | 0.16 | 0.06 ± 0.15 |
| Sample No. 4-2 | −0.13 | | −0.04 | |
| Sample No. 41-1 | 0.50 | 0.11 ± 0.55 | 0.17 | 0.04 ± 0.18 |
| Sample No. 41-2 | −0.27 | | −0.09 | |
| Sample No. 42-1 | −0.13 | 0.27 ± 0.58 | −0.04 | 0.09 ± 0.19 |
| Sample No. 42-2 | 0.68 | | 0.23 | |
| Sample No. 43-1 | 2.04 | 2.29 ± 0.35 | 0.68 | 0.76 ± 0.12 |
| Sample No. 43-2 | 2.53 | | 0.84 | |
| Methanol | | | | |
| Sample No. 4-1 | 0.37 | 0.25 ± 0.18 | 0.12 | 0.08 ± 0.06 |
| Sample No. 4-2 | 0.13 | | 0.04 | |
| Sample No. 41-1 | 0.02 | 0.05 ± 0.05 | 0.01 | 0.02 ± 0.02 |
| Sample No. 41-2 | 0.08 | | 0.03 | |
| Sample No. 42-1 | 0.28 | 0.25 ± 0.05 | 0.09 | 0.08 ± 0.02 |
| Sample No. 42-2 | 0.21 | | 0.07 | |
| Sample No. 43-1 | 0.27 | 0.41 ± 0.2 | 0.09 | 0.14 ± 0.07 |
| Sample No. 43-2 | 0.55 | | 0.18 | |

The error was derived from the standard deviation of duplicates in each sample.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A pipe section, comprising:
   a hollow body, the hollow body having an inner surface and an outer surface, the inner surface defining an interior;
   a barrier layer surrounding the hollow body, the barrier layer having an inner surface and an outer surface, the barrier layer formed from a tape comprising a polyarylene sulfide composition, the polyarylene sulfide composition comprising a polyarylene sulfide and a crosslinked epoxy-functionalized impact modifier.

2. The pipe section of claim 1, wherein the polyarylene sulfide is polyphenylene sulfide.

3. The pipe section of claim 1, wherein the polyarylene sulfide is a functionalized polyarylene sulfide.

4. The pipe section of claim 1, wherein the polyarylene sulfide composition has an elongation at yield of greater than about 7%.

5. The pipe section of claim 1, wherein the polyarylene sulfide composition has a tensile modulus of less than about 2300 MPa.

6. The pipe section of claim 1, wherein the polyarylene sulfide composition has a notched Charpy impact strength of greater than about 3 kJ/m² as measured according to ISO Test No. 179-1 at a temperature of 23° C.

7. The pipe section of claim 1, wherein the polyarylene sulfide composition has a notched Charpy impact strength of greater than about 8 kJ/m² as measured according to ISO Test No. 179-1 at a temperature of −30° C.

8. The pipe section of claim 1, wherein the crosslinked impact modifier comprises the reaction product of an epoxy functionality of the impact modifier and a crosslinking agent.

9. The pipe section of claim 1, wherein the crosslinked impact modifier comprises the reaction product of maleic anhydride functionality of the impact modifier and a crosslinking agent.

10. The pipe section of claim 1, wherein the polyarylene sulfide composition is free of plasticizers.

11. The pipe section of claim 1, wherein the tape is wrapped helically around the hollow body with respect to a longitudinal axis of the hollow body.

12. The pipe section of claim 1, wherein the polyarylene sulfide composition comprises fibers.

13. The pipe section of claim 12, wherein the fibers are continuous fibers.

14. The pipe section of claim 13, wherein the continuous fibers are unidirectional.

15. The pipe section of claim 1, wherein the barrier layer is bonded to the hollow body.

16. The pipe section of claim 1, wherein the barrier layer and hollow body are unbonded.

17. The pipe section of claim 1, wherein the hollow body is formed from a thermoplastic material.

18. The pipe section of claim 17, wherein the thermoplastic material is a polyarylene sulfide composition.

19. The pipe section of claim 18, wherein the polyarylene sulfide composition of the thermoplastic material includes a polyarylene sulfide and a crosslinked impact modifier.

20. The pipe section of claim 1, wherein the hollow body is formed from a metal material.

21. The pipe section of claim 1, wherein the epoxy-functionalized impact modifier includes methacrylic monomer units.

22. The pipe section of claim 21, the epoxy-functionalized impact modifier further includes α-olefin monomer units.

23. The pipe section of claim 1, wherein the crosslinked impact modifier is a reaction product of epoxy-functionalized monomer units and a polyfunctional crosslinking agent.

24. The pipe section of claim 23, wherein the polyfunctional crosslinking agent includes a carboxylic acid.

25. The pipe section of claim 24, wherein the carboxylic acid includes isophthalic acid, terephthalic acid, phthalic acid, or a combination thereof.

26. The pipe section of claim 23, wherein the epoxy-functionalized monomer units include epoxy-functionalized methacrylic monomer units.

27. The pipe section of claim 23, wherein the polyarylene sulfide, impact modifier, and crosslinking agent are melt-processed together.

28. The pipe section of claim 1, wherein polyarylene sulfides constitute from about 20 wt. % to about 90 wt. % by weight of the composition.

29. The pipe section of claim 1, wherein the polyarylene sulfide is functionalized.

30. The pipe section of claim 29, wherein the functionalized polyarylene sulfide is a reaction product of a polyarylene sulfide and a disulfide compound having a reactive functionality.

31. A pipe section, comprising:
a hollow body, the hollow body having an inner surface and an outer surface, the inner surface defining an interior;
a barrier layer surrounding the hollow body, the barrier layer having an inner surface and an outer surface, the barrier layer comprising a continuous fiber reinforced polyarylene sulfide composition, the polyarylene sulfide composition comprising a polyarylene sulfide and a crosslinked epoxy-functionalized impact modifier.

32. The pipe section of claim 31, wherein the barrier layer is formed from a tape.

33. The pipe section of claim 31, wherein the continuous fibers are unidirectional.

* * * * *